(12) United States Patent
Tong et al.

(10) Patent No.: US 12,166,550 B2
(45) Date of Patent: Dec. 10, 2024

(54) LOCATION SENSING METHOD AND APPARATUS, AND POSITIONING METHOD AND APPARATUS

(71) Applicant: HUAWEI TECHNOLOGIES CO., LTD., Guangdong (CN)

(72) Inventors: Xinyu Tong, Shanghai (CN); Hao Li, Shanghai (CN); Xiaohua Tian, Shanghai (CN); Yixin Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 501 days.

(21) Appl. No.: 17/362,109

(22) Filed: Jun. 29, 2021

(65) Prior Publication Data

US 2021/0328647 A1 Oct. 21, 2021

Related U.S. Application Data

(63) Continuation of application No. PCT/CN2019/114776, filed on Oct. 31, 2019.

(30) Foreign Application Priority Data

Dec. 29, 2018 (CN) .......................... 201811645469.5

(51) Int. Cl.
*H04B 7/06* (2006.01)
*H04B 7/01* (2006.01)
*H04B 7/024* (2017.01)

(52) U.S. Cl.
CPC ............. *H04B 7/0626* (2013.01); *H04B 7/01* (2013.01); *H04B 7/024* (2013.01)

(58) Field of Classification Search
CPC ........ H04B 7/0626; H04B 7/01; H04B 7/024; G01S 3/48; G01S 5/0289; G01S 5/08; H04W 64/006; H04W 64/00; H04W 4/023
See application file for complete search history.

(56) References Cited

U.S. PATENT DOCUMENTS 6,212,391 B1 4/2001 Saleh et al.
2011/0053613 A1* 3/2011 Zhou ..................... H04W 64/00
455/456.2

(Continued)

FOREIGN PATENT DOCUMENTS

CN 105611627 A 5/2016
CN 106231670 A 12/2016

(Continued)

OTHER PUBLICATIONS

Deepak Vasisht et al, Decimeter-Level Localization with a Single WiFi Access Point, 13th USENIX Symposium on Networked Systems Design and Implementation (NSDI 16), Mar. 16-18, 2016 Santa Clara, CA, USA, total 15 pages.

(Continued)

*Primary Examiner* — Chirag G Shah
*Assistant Examiner* — Joshua Smith
(74) *Attorney, Agent, or Firm* — HUAWEI TECHNOLOGIES CO., LTD.

(57) ABSTRACT

A device location sensing method obtains locations of N devices in a wireless network based on channel state information (CSI). Each device in the wireless network has M antennas arranged in a non-linear manner. To determine the device locations, CSI data mutually detected between every two devices in N devices is obtained and used to calculate an angle difference of arrival (ADoA) set which includes, for every two devices in the N devices relative to each of the other devices in the N devices, an ADoA that is a difference between angles of arrival (AoAs) of the two devices relative to the other device. Relative locations of the N devices are then calculated based on the ADoA set.

12 Claims, 8 Drawing Sheets

(56) References Cited

U.S. PATENT DOCUMENTS

| | | | | |
|---|---|---|---|---|
| 2015/0011238 A1* | 1/2015 | Tujkovic | ............... | H04W 4/02 |
| | | | | 455/456.1 |
| 2015/0234033 A1 | 8/2015 | Jamieson et al. | | |
| 2016/0337811 A1* | 11/2016 | Aström | ............... | H04W 4/023 |
| 2016/0345286 A1 | 11/2016 | Jamieson et al. | | |
| 2018/0149729 A1* | 5/2018 | Grandin | ............... | G01S 5/0249 |
| 2019/0116605 A1* | 4/2019 | Luo | ............... | H04B 7/024 |

FOREIGN PATENT DOCUMENTS

| | | | |
|---|---|---|---|
| CN | 106658713 A | 5/2017 | |
| CN | 107015198 A | 8/2017 | |
| CN | 107241698 A | 10/2017 | |
| WO | 2017210359 A1 | 12/2017 | |
| WO | 2018206098 A1 | 11/2018 | |

OTHER PUBLICATIONS

Krishna Chintalapudi et al, Indoor Localization Without the Pain, MobiCom 10, Sep. 20-24, 2010, Chicago, Illinois, USA, total 12 pages.

Ju Wang et al, LiFS: Low human-effort, device-free localization with fifine-grained subcarrier information, MobiCom '16: Proceedings of the 22nd Annual International Conference on Mobile Computing andNetworking: New York, Oct. 3-7, 2016, total 16 pages.

Anshul Rai et al, Zee: Zero-Effort Crowdsourcing for Indoor Localization, MobiCom 12, Aug. 22-26, 2012, Istanbul, Turkey, total 12 pages.

* cited by examiner

LOCATION SENSING METHOD AND APPARATUS, AND POSITIONING METHOD AND APPARATUS

CROSS-REFERENCE TO RELATED APPLICATIONS

This application is a continuation of International Application No. PCT/CN2019/114776, filed on Oct. 31, 2019, which claims priority to Chinese Patent Application No. 201811645469.5, filed on Dec. 29, 2018. The disclosures of the aforementioned priority applications are hereby incorporated by reference in their entirety.

TECHNICAL FIELD

This application relates to the field of location sensing technologies, and in particular, to a location sensing method and apparatus based on channel state information (CSI).

BACKGROUND

With the popularization of internet of things (internet of things, IoT) devices and rapid development of IoT technologies, smart home applications gradually enter people's home. Therefore, services based on location information attract more attention, and positioning technologies have high development potential in terms of both commercial value and social value. For example, automatic lighting adjustment, automatic temperature control, and intelligent function push, which brings new possibilities for diversified and intelligent home life. To provide precise and convenient location-based services, it is important to construct a relative layout of home IoT device space. In the prior art, a Wi-Fi positioning system based on channel state information (CSI) can implement decimeter-level precision. For example, an access point (AP) parses and obtains CSI from a signal sent by a to-be-positioned target object. The CSI indicates impact of a communications channel on a feature, for example an amplitude and a phase, of a sent signal. The phase may be used to calculate an angle of arrival (AoA). For 2.4G-5G Wi-Fi signals, using CSI to calculate the AoA usually requires at least two antennas be installed on a device, to meet an angle of arrival technology. Then, a location of a to-be-determined target is obtained based on a set of AoAs measured by a plurality of APs.

Although the CSI-based Wi-Fi positioning system has a good performance, the existing CSI-based Wi-Fi positioning system requires a large amount of manual calibration, which hinders large-scale deployment. Manual calibration means that a service provider or a user needs to determine relative locations of all APs or absolute locations of all APs on a map in advance. In addition, because AoA is related to an antenna array direction, in the positioning process of the CSI-based Wi-Fi positioning system, the service provider or the user also needs to determine directions of antenna arrays of all the APs.

In addition, CSI directly collected by an AP cannot be used to calculate the AoA, mainly because a phase of the directly obtained CSI is affected by a down-sampling phase difference (down-conversion phase offset). The phase difference is caused by hardware of an AP receiver and remains unchanged in normal communication, but is changed to an unpredictable new value when a device is restarted or a communication channel changes. To allow the CSI to be used to calculate the AoA, the down-sampling phase difference needs to be eliminated. However, based on an existing commercial Wi-Fi device, in a method for eliminating a down-sampling phase difference, in addition to manual measurement, a location of an AP and a direction of an antenna array still need to be learned.

SUMMARY

For the foregoing technical problem in the prior art, embodiments of the present invention provide a CSI-based location sensing method and apparatus, and a CSI-based positioning method and apparatus. A high-precision positioning service can be implemented without using a labor-intensive method for recording a location of a positioning device and an antenna array direction. In other words, a mechanism for automatically calibrating by a positioning system is provided.

According to a first aspect, an embodiment of this application provides a location sensing method based on channel state information (CSI). The location sensing method includes: obtaining CSI data mutually detected between every two devices in N devices, where N is an integer greater than or equal to 3, M antennas arranged in a non-linear manner are configured for each device, and M is an integer greater than or equal to 3; obtaining an angle difference of arrival (ADoA) set based on the obtained CSI data, where the ADoA set includes an ADoA of every two devices in the N devices relative to each of the other devices, and the ADoA is a difference between angles of arrival AoAs of the two devices relative to a same device; and obtaining relative locations of the N devices based on the obtained ADoA set. A process of determining the relative locations of the N devices may be understood as a process of constructing a location layout of the N devices. Optionally, any piece of CSI data may be denoted as $Ke^{j\varphi}$, where K indicates an amplitude of channel attenuation, $\varphi$ indicates a phase change of a signal on a channel, e indicates an Euler number, and j indicates an imaginary number.

In a possible implementation, the obtaining an angle difference of arrival (ADoA) set based on the obtained CSI data includes: any ADoA in the ADoA set may be obtained by performing the following method steps: obtaining a corresponding antenna phase difference set $R_{(B \to A)}$ based on CSI data of a device B that is detected by a device A, and obtaining a corresponding antenna phase difference set $R_{(C \to A)}$ based on CSI data of a device C that is detected by the device A, where the device A, the device B, and the device C are any one of the N devices, and the device A, the device B, and the device C are not a same device; the antenna phase difference set $R_{(B \to A)}$ is denoted as $\{\phi_{xy(B \to A)} | x, y < M, x \neq y\}$, and $\phi_{xy(B \to A)}$ indicates a phase difference between an $x^{th}$ antenna and a $y^{th}$ antenna of the device A in the antenna phase difference set $R_{(B \to A)}$; and the antenna phase difference set $R_{(C \to A)}$ is denoted as $\{\phi_{xy(C \to A)} | x, y < M, x \neq y\}$, and $\phi_{xy(C \to A)}$ indicates a phase difference between the $x^{th}$ antenna and the $y^{th}$ antenna of the device A in the antenna phase difference set $R_{(C \to A)}$; and obtaining an ADoA of the device B and the device C relative to the device A based on the antenna phase difference set $R_{(B \to A)}$ and the antenna phase difference set $R_{(C \to A)}$. In this embodiment of this application, a concept of an ADoA set relationship is introduced into the CSI-based location sensing method, so that a location can be determined by using CSI data if an antenna array direction of a device is unknown.

In a possible implementation, the obtaining an ADoA of the device B and the device C relative to the device A based on the antenna phase difference set $R_{(B \to A)}$ and the antenna phase difference set $R_{(C \to A)}$ includes: selecting a plurality of ($\theta_1$, $\theta_2$) combinations within a range [0,2π]×[0,2π], where $\theta_1$ and $\theta_2$ indicate included angles between a direction on a plane on which the M antennas of the device A are located and a reference direction, and the reference direction is any direction on the plane on which the M antennas of the device A are located; obtaining a first energy spectrum based on the antenna phase difference set $R_{(B \to A)}$, the antenna phase difference set $R_{(C \to A)}$, and the plurality of combinations of ($\theta_1$, $\theta_2$), where each value in the first energy spectrum corresponds to one ($\theta_1$, $\theta_2$) combination and indicates a possibility that the corresponding ($\theta_1$, $\theta_2$) combination is a target ($\theta_1$, $\theta_2$) combination; and the target ($\theta_1$, $\theta_2$) combination indicates a combination of the AoA of the device B and the device C relative to the device A; obtaining a ($\theta_1$, $\theta_2$) combination corresponding to a peak value in the first energy spectrum as the target ($\theta_1$, $\theta_2$) combination; and calculating the ADoA of the device B and the device C relative to the device A based on the target ($\theta_1$, $\theta_2$) combination. Because ($\theta_1$, $\theta_2$) is randomly selected within the range [0,2π]×[0,2π], the AoA mentioned herein is an assumed AoA.

In a possible implementation, a value that is in the first energy spectrum and that corresponds to a ($\theta_1$, $\theta_2$) combination is calculated according to the following formula:

$$\frac{1}{P(\theta_1, \theta_2)} = \sum_{x \neq y} \left| \frac{e^{j\phi_{xy(B \to A)}} \, e^{j2\pi d_{xy} \cos(\vartheta_{xy} - \theta_1)f/c}}{e^{j\phi_{xy(C \to A)}} \, e^{j2\pi d_{xy} \cos(\vartheta_{xy} - \theta_2)f/c}} - 1 \right|$$

where $P(\theta_1, \theta_2)$ indicates the value in the first energy spectrum, $d_{xy}$ indicates a distance between the $x^{th}$ antenna and the $y^{th}$ antenna of the device A, $\vartheta_{xy}$ indicates an included angle between a connection direction of the $x^{th}$ antenna and the $y^{th}$ antenna of the device A and the reference direction, f is a frequency of a signal, c is a speed of light, e indicates an Euler number, and j indicates an imaginary number.

In a possible implementation, the calculating the ADoA of the device B and the device C relative to the device A based on the target ($\theta_1$, $\theta_2$) combination includes:

calculating the ADoA of the device B and the device C relative to the device A according to the following formula:

$\Delta\theta_{(BAC)} = |\theta_{1\,target} - \theta_{2\,target}|$ where $\Delta\theta_{(BAC)}$ indicates the ADoA of the device B and the device C relative to the device A, and $\theta_{1\,target}$, $\theta_{2\,target}$ are respectively $\theta_1$, $\theta_2$ in the target ($\theta_1$, $\theta_2$) combination.

In a possible implementation, the first energy spectrum has two peak values; and the obtaining a ($\theta_1$, $\theta_2$) combination corresponding to a peak value in the first energy spectrum as the target ($\theta_1$, $\theta_2$) combination includes: obtaining a ($\theta_1$, $\theta_2$) combination corresponding to either of the two peak values as the target ($\theta_1$, $\theta_2$) combination.

In a possible implementation, the first energy spectrum has at least two peak values, and N is an integer greater than or equal to 4; and the obtaining a ($\theta_1$, $\theta_2$) combination corresponding to a peak value in the first energy spectrum as the target ($\theta_1$, $\theta_2$) combination includes: obtaining a first down-sampling phase difference set of a ($\theta_1$, $\theta_2$) combination corresponding to each peak value, where one ($\theta_1$, $\theta_2$) combination corresponds to one first down-sampling phase difference set; and obtaining, based on the first down-sampling phase difference set and by using a clustering method, the target ($\theta_1$, $\theta_2$) combination from ($\theta_1$, $\theta_2$) combinations corresponding to all peak values.

In a possible implementation, the obtaining a first down-sampling phase difference set of a ($\theta_1$, $\theta_2$) combination corresponding to each peak value includes: if a first down-sampling phase difference set of a ($\theta_1$, $\theta_2$) combination corresponding to any peak value is denoted as $\{(\phi_{xy}^{Down} | x, y \leq M, x \neq y\}$, calculating $\phi_{xy}^{Down}$ according to the following formula:

$$\phi_{xy}^{Down} = \phi_{xy(B \to A)} + 2\pi d_{xy} \cos(\vartheta_{xy} + \theta_1)f/c, \text{ or}$$

$$\phi_{xy}^{Down} = \phi_{xy(C \to A)} + 2\pi d_{xy} \cos(\vartheta_{xy} + \theta_2)f/c, \text{ or}$$

$$\phi_{xy}^{Down} = \left(\left(\phi_{xy(B \to A)} + \frac{2\pi d_{xy} \cos(\vartheta_{xy} + \theta_1)f}{c}\right) + \left(\phi_{xy(C \to A)} + \frac{2\pi d_{xy} \cos(\vartheta_{xy} + \theta_2)f}{c}\right)\right)/2$$

where $d_{xy}$ indicates the distance between the $x^{th}$ antenna and the $y^{th}$ antenna of the device A, $\vartheta_{xy}$ indicates the included angle between the connection direction of the $x^{th}$ antenna and the $y^{th}$ antenna of the device A and the reference direction, f is the frequency of the signal, c is the speed of light.

In a possible implementation, the obtaining, based on the first down-sampling phase difference set and by using a clustering method, the target ($\theta_1$, $\theta_2$) from ($\theta_1$, $\theta_2$) combinations corresponding to all peak values includes: obtaining a second down-sampling phase difference set of a ($\theta_1$, $\theta_3$) combination corresponding to each peak value in a second energy spectrum; and in a same coordinate system, separately using the first down-sampling phase difference set and the second down-sampling phase difference set as coordinates, obtaining a ($\theta_1$, $\theta_2$) combination corresponding to a first down-sampling phase difference set corresponding to a coordinate point closest to a coordinate point corresponding to the second down-sampling phase difference set, and using the ($\theta_1$, $\theta_2$) combination as the target ($\theta_1$, $\theta_2$) combination.

In a possible implementation, for obtaining the second down-sampling phase difference set of the ($\theta_1$, $\theta_3$) combination corresponding to each peak value in the second energy spectrum, refer to the method for obtaining the first down-sampling phase difference set.

In a possible implementation, the CSI-based location sensing method further includes: obtaining the ADoA of the device B and the device D relative to the device A based on a ($\theta_1$, $\theta_3$) combination corresponding to the second down-sampling phase difference set corresponding to the coordinate point closest to the coordinate point corresponding to the target ($\theta_1$, $\theta_2$) combination.

In a possible implementation, the CSI-based location sensing method further includes: obtaining the ADoA of the device C and the device D relative to the device A based on $\theta_2$ in the target ($\theta_1$, $\theta_2$) combination and based on $\theta_3$ in a ($\theta_1$, $\theta_3$) combination corresponding to the second down-sampling phase difference set corresponding to the coordinate point closest to the coordinate point corresponding to the target ($\theta_1$, $\theta_2$) combination.

In a possible implementation, the phase difference $\phi_{xy}$ between the $x^{th}$ antenna and the $y^{th}$ antenna of the device A is calculated according to the following formula:

$$e^{j\phi_{xy}} = \frac{e^{j\varphi_y}}{e^{j\varphi_x}}$$

where $\varphi_x$ indicates the phase change $\varphi$, on the channel, of the signal in CSI data detected by the $x^{th}$ antenna of the device A, and $\varphi_y$ indicates the phase change (p, on the channel, of the signal in CSI data detected by the $y^{th}$ antenna of the device A.

In a possible implementation, N is an integer greater than or equal to 4, and the obtaining relative locations of the N devices based on the ADoA set includes: randomly selecting at least three devices from the N devices; obtaining, from the ADoA set, an ADoA of every two devices in the at least three devices relative to each of the other devices; constructing relative locations of the at least three devices based on the ADoA of every two devices in the at least three devices relative to each of the other devices; obtaining an ADoA related to a device Q from the ADoA set to form a set E, where the device Q is any one of the N devices and is not the same device as the at least three devices, the set E includes the ADoA of every two devices in the at least three devices relative to the device Q, and an ADoA of the device Q and each of the at least three devices relative to each of the other devices in the at least three devices; obtaining relative locations between the device Q and the at least three devices based on the set E and the relative locations of the at least three devices; and repeating the last two steps until the relative locations of all the N devices are obtained.

In a possible implementation, the obtaining relative locations between the device Q and the at least three devices based on the set E and the relative locations of the at least three devices includes: selecting a plurality of evaluation locations of the device Q based on the relative locations of the at least three devices, where the evaluation locations indicate to-be-determined relative locations between the device Q and the at least three devices, and there is not a case that each evaluation location is an assumed location of the device Q before the evaluation locations are finally determined as the relative locations between the device Q and the at least three devices; calculating error values based on the set E and a plurality of evaluation ADoA sets corresponding to the plurality of evaluation locations, where the plurality of evaluation locations one-to-one correspond to the plurality of evaluation ADoA sets, ADoAs in each evaluation ADoA set one-to-one correspond to ADoAs in the set E, and one evaluation ADoA set corresponds to one error value; and obtaining the relative locations between the device Q and the three devices based on an evaluation location corresponding to a target evaluation ADoA set, where the target evaluation ADoA set is an evaluation ADoA set that is in the plurality of evaluation ADoA sets and that corresponds to a smallest error value.

In a possible implementation, the error value is calculated according to the following formula:

$$e = \sum_{\substack{\Delta\theta \in E \\ \Delta\theta' \in F}} (\Delta\theta - \Delta\theta')^2$$

where E indicates the set E, $\Delta\theta$ indicates the ADoA in E, F indicates any one of the plurality of evaluation ADoA sets, $\Delta\theta'$ indicates an ADoA corresponding to $\Delta\theta$ in F, and e indicates an error value corresponding to F.

In a possible implementation, the evaluation location corresponding to the target evaluation ADoA set is calculated according to the following formula:

$$L_Q = \arg \min_{L \in G} \sum_{\substack{\Delta\theta \in E \\ \Delta\theta' \in F_L}} (\Delta\theta - \Delta\theta')^2$$

where $L_Q$ indicates the evaluation location corresponding to the target evaluation ADoA set, G indicates the plurality of evaluation locations, L indicates any evaluation location in G, E indicates the set E, $\Delta\theta$ indicates the ADoA in E, $F_L$ indicates an evaluation ADoA set corresponding to L, and $\Delta\theta'$ indicates an ADoA corresponding to $\Delta\theta$ in $F_L$.

In a possible implementation, the CSI-based location sensing method further includes: obtaining geographical locations of any W devices in the N devices, where W is an integer greater than or equal to 3; and obtaining an geographical location of each of the N devices based on the geographical locations of the W devices and the relative locations of the N devices.

According to the CSI-based location sensing method provided in this embodiment of this application, relative locations of a plurality of devices can be obtained without a large amount of manual calibration and antenna array direction parameters of APs. In other words, a location layout of the plurality of devices that can be used for positioning is constructed. When the location layout obtained according to the foregoing method is used for positioning, a positioning result is a relative location of a to-be-positioned target in the location layout. Even if an geographical location of the to-be-positioned target is expected to be obtained, the APs are used as an example, in the foregoing CSI-based location sensing method, geographical locations of a few APs may also be obtained, to obtain geographical locations of all the APs in the location layout based on relative locations of a plurality of APs, so as to provide a positioning service for an geographical location. This also greatly reduces workload of manual AP location calibration. The CSI-based location sensing method may be considered as a self-calibration mechanism of a positioning system, which can reduce workload of manually recording an AP location and an antenna array direction. An ADoA concept is proposed. The ADoA can be obtained if an AP location, an antenna array direction, and phase offset are unknown, and an overall AP location layout is obtained based on the ADoA. The positioning system includes N devices and servers and can be used to provide a positioning service.

According to a second aspect, an embodiment of this application provides a location sensing apparatus. The location sensing apparatus includes a plurality of modules, and can implement steps of the CSI-based location sensing method described in the first aspect and the possible implementations of the first aspect.

According to a third aspect, an embodiment of this application provides a positioning method based on channel state information (CSI). The positioning method includes: obtaining CSI data, of a to-be-positioned device P0, that is detected by H devices, where M antennas arranged in a non-linear manner are configured for each of the H devices, H is an integer greater than or equal to 3, and M is an integer greater than or equal to 3; obtaining a first angle difference of arrival (ADoA) set based on the CSI data, where the first ADoA set includes an ADoA of the to-be-positioned device P0 and each of the H devices relative to each of the other devices in the H devices; and the ADoA is a difference between angles of arrival AoAs of two devices relative to a same device; and obtaining location information of the to-be-positioned device P0 based on the first ADoA set and location information of the H devices. 33. In the positioning method, any piece of CSI data may be denoted as $Ke^{j\varphi}$, K indicates an amplitude of channel attenuation, φ indicates a phase change of a signal on a channel, e indicates an Euler number, and j indicates an imaginary number. The CSI data may be obtained by parsing a signal. A parsing method may be any one of parsing methods used in the prior art.

In a possible implementation, the obtaining a first angle difference of arrival (ADoA) set based on the CSI data includes: obtaining a corresponding antenna phase difference set $R_{(P0 \to P1)}$ based on the CSI data of the to-be-positioned device P0 that is detected by a device P1, and obtaining a corresponding antenna phase difference set $R_{(P2 \to P1)}$ based on CSI data of a device P2 that is detected by the device P1, where the device P1 and the device P2 are any one of the H devices, and the device P1 and the device P2 are not a same device; the antenna phase difference set $R_{(P0 \to P1)}$ is denoted as $\{\phi_{xy(P0 \to P1)} | x, y < M, x \neq y\}$, and $\phi_{xy(P0 \to P1)}$ indicates a phase difference between an $x^{th}$ antenna and a $y^{th}$ antenna of the device P1 in the antenna phase difference set $R_{(P0 \to P1)}$; and the antenna phase difference set $R_{(P2 \to P1)}$ is denoted as $\{\phi_{xy(P2 \to P1)} | x, y < M, x \neq y\}$, and $\phi_{xy(P2 \to P1)}$ indicates a phase difference between the $x^{th}$ antenna and the $y^{th}$ antenna of the device P1 in the antenna phase difference set $R_{(P2 \to P1)}$; and obtaining an ADoA of the to-be-positioned device P0 and the device P2 relative to the device P1 based on the antenna phase difference set $R_{(P0 \to P1)}$ and the antenna phase difference set $R_{(P2 \to P1)}$.

In a possible implementation, the obtaining an ADoA of the to-be-positioned device P0 and the device P2 relative to the device P1 based on the antenna phase difference set $R_{(P0 \to P1)}$ and the antenna phase difference set $R_{(P2 \to P1)}$ includes: selecting a plurality of $\theta_{P0}$ within a range $[0,2\pi]$, where $\theta_{P0}$ indicates an included angle between a direction on a plane on which the M antennas of the device P1 are located and a reference direction, and the reference direction is any direction on the plane on which the M antennas of the device P1 are located; obtaining a plurality of $(\theta_{P0}, \theta_{P2})$ combinations based on the plurality of $\theta_{P0}$ and prestored $\theta_{P2}$ where $\theta_{P2}$ indicates an AoA of the device P2 relative to the device P1, and the AoA indicates an included angle between a projection of a signal direction on the plane on which the M antennas of the device P1 are located and the reference direction; obtaining a third energy spectrum based on the antenna phase difference set $R_{(P0 \to P1)}$, the antenna phase difference set $R_{(P2 \to P1)}$, and the plurality of $(\theta_{P0}, \theta_{P2})$ combinations, where each value in the third energy spectrum corresponds to one $(\theta_{P0}, \theta_{P2})$ combination and indicates a possibility that the corresponding $(\theta_{P0}, \theta_{P2})$ combination is a target $(\theta_{P0}, \theta_{P2})$ combination, the target $(\theta_{P0}, \theta_{P2})$ combination indicates a combination of the AoA of the to-be-positioned device P0 and the device P2 relative to the device P1, and because $\theta_{P0}$ is randomly selected within the range $[0,2\pi]$, the AoA of the device P0 relative to the device P1 mentioned herein is an assumed AoA; obtaining a $(\theta_{P0}, \theta_{P2})$ combination corresponding to a maximum value in the third energy spectrum as the target $(\theta_{P0}, \theta_{P2})$ combination; and calculating the ADoA of the to-be-positioned device P0 and the device P2 relative to the device P1 based on the target $(\theta_{P0}, \theta_{P2})$ combination.

In a possible implementation, the obtaining an ADoA of the to-be-positioned device P0 and the device P2 relative to the device P1 based on the antenna phase difference set $R_{(P0 \to P1)}$ and the antenna phase difference set $R_{(P2 \to P1)}$ includes: selecting a plurality of $(\theta_{P0}, \theta_{P2})$ combinations within a range $[0,2\pi] \times [0,2\pi]$, where $\theta_{P0}$ and $\theta_{P2}$ indicate included angles between a direction on a plane on which the M antennas of the device P1 are located and a reference direction, and the reference direction is any direction on the plane on which the M antennas of the device P1 are located; obtaining a third energy spectrum based on the antenna phase difference set $R_{(P0 \to P1)}$, the antenna phase difference set $R_{(P2 \to P1)}$, and the plurality of $(\theta_{P0}, \theta_{P2})$ combinations, where each value in the third energy spectrum corresponds to one $(\theta_{P0}, \theta_{P2})$ combination and indicates a possibility that the corresponding $(\theta_{P0}, \theta_{P2})$ combination is a target $(\theta_{P0}, \theta_{P2})$ combination, the target $(\theta_{P0}, \theta_{P2})$ combination indicates a combination of the AoA of the to-be-positioned device P0 and the device P2 relative to the device P1, and because $(\theta_{P0}, \theta_{P2})$ is randomly selected within the range $[0,2\pi] \times [0,2\pi]$, the AoA of the device P0 relative to the device P1 mentioned herein is an assumed AoA; obtaining a $(\theta_{P0}, \theta_{P2})$ combination corresponding to a peak value in the third energy spectrum as the target $(\theta_{P0}, \theta_{P2})$ combination; and calculating the ADoA of the to-be-positioned device P0 and the device P2 relative to the device P1 based on the target $(\theta_{P0}, \theta_{P2})$ combination.

In a possible implementation, a value that is in the third energy spectrum and that corresponds to a $(\theta_{P0}, \theta_{P2})$ combination is calculated according to the following formula:

$$\frac{1}{P(\theta_{P0}, \theta_{P2})} = \sum_{x \neq y} \left| \frac{e^{j\phi_{xy(P0 \to P1)}} \; e^{j2\pi d_{xy} \cos(\vartheta_{xy} - \theta_{P0})f/c}}{e^{j\phi_{xy(P2 \to P1)}} \; e^{j2\pi d_{xy} \cos(\vartheta_{xy} - \theta_{P2})f/c}} - 1 \right|$$

where $P(\theta_{P0}, \theta_{P2})$ indicates the value in the third energy spectrum, $d_{xy}$ indicates a distance between the $x^{th}$ antenna and the $y^{th}$ antenna of the device P1, $\vartheta_{xy}$ indicates an included angle between a connection direction of the $x^{th}$ antenna and the $y^{th}$ antenna of the device P1 and the reference direction, f is a frequency of a signal, c is a speed of light, e indicates an Euler number, and j indicates an imaginary number.

In a possible implementation, the third energy spectrum has two peak values; and the obtaining a $(\theta_{P0}, \theta_{P2})$ combination corresponding to a peak value in the third energy spectrum as the target $(\theta_{P0}, \theta_{P2})$ combination includes: obtaining a $(\theta_{P0}, \theta_{P2})$ combination corresponding to either of the two peak values as the target $(\theta_{P0}, \theta_{P2})$ combination.

In a possible implementation, the third energy spectrum has at least two peak values; and the obtaining a $(\theta_{P0}, \theta_{P2})$ combination corresponding to a peak value in the third energy spectrum as the target $(\theta_{P0}, \theta_{P2})$ combination includes: obtaining a third down-sampling phase difference set of a $(\theta_{P0}, \theta_{P2})$ combination corresponding to each peak value, where one $(\theta_{P0}, \theta_{P2})$ combination corresponds to one third down-sampling phase difference set; and obtaining, based on the third down-sampling phase difference set and by using a clustering method, the target $(\theta_{P0}, \theta_{P2})$ from $(\theta_{P0}, \theta_{P2})$ combinations corresponding to all peak values.

In a possible implementation, the obtaining a third down-sampling phase difference set of a $(\theta_{P0}, \theta_{P2})$ combination corresponding to each peak value includes: if a third down-sampling phase difference set of a $(\theta_{P0}, \theta_{P2})$ combination corresponding to any peak value is denoted as $\{\phi_{xy}^{Down} | x, y \leq M, x \neq y\}$, calculating $\phi_{xy}^{Down}$ according to the following formula:

$$\phi_{xy}^{Down} = \phi_{xy(B \to A)} + 2\pi d_{xy} \cos(\vartheta_{xy} + \theta_1)f/c, \text{ or}$$

-continued $$\phi_{xy}^{Down} = \phi_{xy(C \to A)} + 2\pi d_{xy} \cos(\vartheta_{xy} + \theta_2)f/c, \text{ or}$$

$$\phi_{xy}^{Down} = \left(\left(\phi_{xy(P0 \to P1)} + \frac{2\pi d_{xy} \cos(\vartheta_{xy} + \theta_{P0})f}{c}\right) + \left(\phi_{xy(P2 \to P1)} + \frac{2\pi d_{xy} \cos(\vartheta_{xy} + \theta_{P2})f}{c}\right)\right)/2$$

where $d_{xy}$ indicates the distance between the $x^{th}$ antenna and the $y^{th}$ antenna of the device P1, $\vartheta_{xy}$ indicates the included angle between the connection direction of the $x^{th}$ antenna and the $y^{th}$ antenna of the device P1 and the reference direction, f is the frequency of the signal, and c is the speed of light.

In a possible implementation, the obtaining, based on the third down-sampling phase difference set and by using a clustering method, the target $(\theta_{P0}, \theta_{P2})$ from $(\theta_{P0}, \theta_{P2})$ combinations corresponding to all peak values includes: obtaining a fourth down-sampling phase difference set of a $(\theta_{P0}, \theta_{P3})$ combination corresponding to each peak value in a fourth energy spectrum; and in a same coordinate system, separately using the third down-sampling phase difference set and the fourth down-sampling phase difference set as coordinates, obtaining a $(\theta_{P0}, \theta_{P2})$ combination corresponding to a third down-sampling phase difference set corresponding to a coordinate point closest to a coordinate point corresponding to the fourth down-sampling phase difference set, and using the $(\theta_{P0}, \theta_{P2})$ combination as the target $(\theta_{P0}, \theta_{P2})$ combination.

For details about how to obtain the fourth down-sampling phase difference set, refer to the foregoing manner of calculating the third down-sampling phase difference set.

In a possible implementation, the positioning method further includes: obtaining the ADoA of the to-be-positioned device P0 and the device P3 relative to the device P1 based on a $(\theta_{P0}, \theta_{P3})$ combination corresponding to the fourth down-sampling phase difference set corresponding to the coordinate point closest to the coordinate point corresponding to the target $(\theta_{P0}, \theta_{P2})$ combination.

In a possible implementation, the positioning method further includes: obtaining an ADoA of the device P2 and the device P3 relative to the device P1 based on $\theta_{P2}$ in the target $(\theta_{P0}, \theta_{P2})$ combination and based on $\theta_{P3}$ in a $(\theta_{P0}, \theta_{P3})$ combination corresponding to the fourth down-sampling phase difference set corresponding to the coordinate point closest to the coordinate point corresponding to the target $(\theta_{P0}, \theta_{P2})$ combination.

In a possible implementation, the ADoA of the to-be-positioned device P0 and the device P2 relative to the device P1 are calculated according to the following formula:

$$\Delta\theta_{(BAC)} = |\theta_{P0 \text{ target}} - \theta_{P1 \text{ target}}|$$

where $\Delta\theta_{(BAC)}$ indicates the ADoA of the to-be-positioned device P0 and the device P2 relative to the device P1, and $\theta_{P0 \text{ target}}$, $\theta_{P2 \text{ target}}$ are respectively $\theta_{P0}$, $\theta_{P2}$ in the target $(\theta_{P0}, \theta_{P2})$ combination.

In a possible implementation, the phase difference $\theta_{xy}$ between the $x^{th}$ antenna and the $y^{th}$ antenna of the device P1 is calculated according to the following formula:

$$e^{j\phi_{xy}} = \frac{e^{j\varphi_y}}{e^{j\varphi_x}}$$

where $\varphi_x$ indicates the phase change $\varphi$, on the channel, of the signal in CSI data detected by the $x^{th}$ of the device P1, and $\varphi_y$ indicates the phase change $\varphi$, on the channel, of the signal in CSI data detected by the $y^{th}$ antenna of the device P1.

In a possible implementation, the obtaining location information of the to-be-positioned device P0 based on the first ADoA set and location information of the H devices includes: selecting a plurality of predicted locations of the to-be-positioned device P0 based on the location information of the H devices, where the predicted location indicates possible location information of the to-be-positioned device P0; calculating a first error value based on the first ADoA set and a plurality of predicted ADoA sets corresponding to the plurality of predicted locations, where the plurality of predicted locations one-to-one correspond to the plurality of predicted ADoA sets, ADoAs in each predicted ADoA set one-to-one correspond to ADoAs in the first ADoA set, and one predicted ADoA set corresponds to one first error value; and obtaining a predicted location corresponding to a target predicted ADoA set as the location information of the to-be-positioned device P0, where the target predicted ADoA set is a predicted ADoA set that is in the plurality of predicted ADoA sets and that corresponds to a smallest first error value.

In a possible implementation, the first error value is calculated according to the following formula:

$$e = \sum_{\substack{\Delta\theta \in E \\ \Delta\theta' \in F}} (\Delta\theta - \Delta\theta')^2$$

where E indicates the first ADoA set, $\Delta\theta$ indicates the ADoA in E, F indicates any one of the plurality of predicted ADoAs sets, $\Delta\theta'$ indicates an ADoA corresponding to $\Delta\theta$ in F, and e indicates a first error value corresponding to F.

In a possible implementation, the predicted location corresponding to the target predicted ADoA set is calculated according to the following formula:

$$L_Q = \arg \min_{L \in K} \sum_{\substack{\Delta\theta \in E \\ \Delta\theta' \in F_L}} (\Delta\theta - \Delta\theta')^2$$

where $L_Q$ indicates the predicted location corresponding to the target predicted ADoA set, K indicates the plurality of predicted locations, L indicates any predicted location in K, E indicates the first ADoA set, $\Delta\theta$ indicates the ADoA in E, $F_L$ indicates a predicted ADoA set corresponding to L, and $\Delta\theta'$ indicates an ADoA corresponding to $\Delta\theta$ in $F_L$.

In a possible implementation, the location information of the H devices is relative locations between the H devices or an geographical location of each of the H devices.

According to the CSI-based positioning method provided in this embodiment of this application, an ADoA geometrical relationship is introduced, so that a to-be-positioned target can be positioned when an antenna array direction of a supporting positioning device (for example, the foregoing H devices) is unknown. This can reduce workload of recording the supporting positioning device. In other words, an antenna direction does not need to be manually calibrated in a same manner as that in an existing positioning technology. In addition, if the to-be-positioned device P0 is a positioning server, the to-be-positioned device P0 can be directly positioned by using the CSI-based positioning method provided in this embodiment of this application, without obtaining the antenna array direction of the supporting positioning device.

According to a fourth aspect, an embodiment of this application provides a positioning apparatus. The positioning apparatus includes a plurality of modules, and can implement steps of the CSI-based positioning method described in the third aspect and the possible implementations of the third aspect.

According to a fifth aspect, an embodiment of this application provides a location sensing apparatus. The location sensing apparatus includes at least one processor. The at least one processor is configured to: be coupled to a memory, read an instruction in the memory, and perform, according to the instruction, steps of the location sensing method described in the first aspect and the possible implementations of the first aspect.

According to a sixth aspect, an embodiment of this application provides a positioning apparatus. The positioning apparatus includes at least one processor. The at least one processor is configured to: be coupled to a memory, read an instruction in the memory, and perform, according to the instruction, steps of the positioning method described in the third aspect and the possible implementations of the third aspect.

According to a seventh aspect, an embodiment of this application provides a computer-readable storage medium. The computer-readable storage medium includes an instruction. When the instruction is run on a computer, the computer performs steps of the location sensing method described in the first aspect and the possible implementations of the first aspect.

According to an eighth aspect, an embodiment of this application provides a computer-readable storage medium. The computer-readable storage medium includes an instruction. When the instruction is run on a computer, the computer performs steps of the positioning method described in the third aspect and the possible implementations of the third aspect.

According to the CSI-based location sensing method provided in this embodiment of this application, relative locations of a plurality of devices can be obtained without a large amount of manual calibration and antenna array direction parameters of APs. In other words, a location layout of the plurality of devices that can be used for positioning is constructed. When the location layout obtained according to the foregoing method is used for positioning, a positioning result is a relative location of a to-be-positioned target in the location layout. Even if an geographical location of the to-be-positioned target is expected to be obtained, the APs are used as an example, in the foregoing CSI-based location sensing method, geographical locations of a few APs may also be obtained, to obtain geographical locations of all the APs in the location layout based on relative locations of a plurality of APs, so as to provide a positioning service for an geographical location. This also greatly reduces workload of manual AP location calibration. The CSI-based location sensing method may be considered as a self-calibration mechanism of a positioning system, which can reduce workload of manually recording an AP location and an antenna array direction. An ADoA concept is proposed. The ADoA can be obtained if an AP location, an antenna array direction, and phase offset are unknown, and an overall AP location layout is obtained based on the ADoA. The positioning system includes N devices and servers and can be used to provide a positioning service.

DESCRIPTION OF EMBODIMENTS

Figure 1:
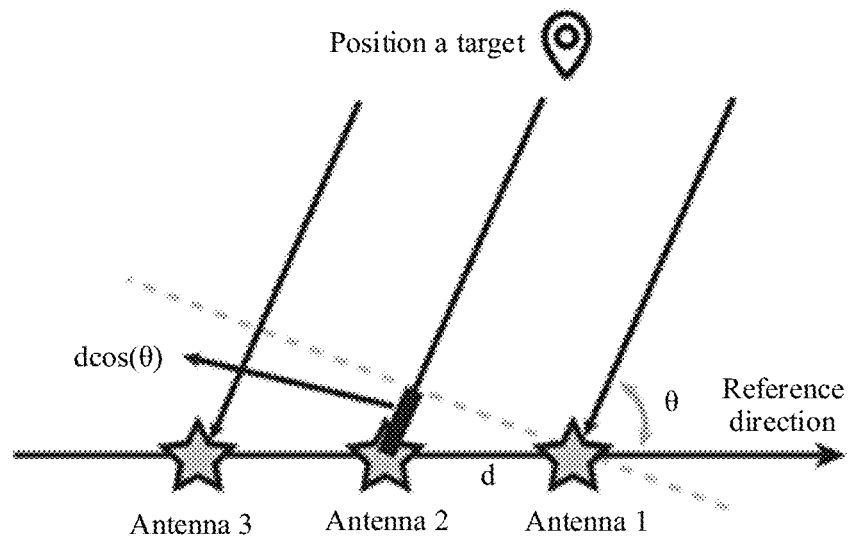
FIG. 1 is a schematic diagram of linear arrangement of three antennas according to an embodiment of this application.

To make the objectives, technical solutions, and advantages of this application clearer, the following further describes the technical solutions of this application in detail with reference to the accompanying drawings. Apparently, the described embodiments are a part rather than all of the embodiments of the present invention. All other embodiments obtained by a person of ordinary skill in the art based on the embodiments of the present invention without creative efforts shall fall within the protection scope of the present invention.

To better understand the embodiments of this application, concepts that may be used in the following embodiments are first explained herein.

An angle difference of arrival (ADoA) refers to a difference between AoAs of two devices (sending devices) relative to a same device (receiving device), that is, a difference between AoAs of signals sent by two sending devices to a same receiving device. Because a direction of an antenna array of a receiving device does not need to be learned in this application, an AoA in this application and an AoA well known in the technical field have different specific definitions. Specifically, the AoA in this application refers to an included angle between a direction of a signal sent by a sending device and a reference direction specified for a receiving device. The reference direction may be any direction on a plane on which a plurality of antennas in the receiving device are located. The device herein is usually an AP, or a device having a same function as the AP.

A down-sampling phase difference (Down-conversion Phase Offset) refers to a fixed phase offset caused by a down-sampling process of a device between different antennas of the same device.

An access point (AP) generally refers to a wireless access point, and is often used to assist positioning in the positioning field. In this application, AP is a possible specific device, and a method and an apparatus provided in the embodiments of this application are not limited to AP.

An antenna array is also referred to as an array of antennas. Directivity of a single antenna is limited. Therefore, to meet application in various scenarios, two or more antennas working at a same frequency are arranged based on certain feed and space requirements, to form an antenna array. "Non-linear antenna arrangement" mentioned in the following refers to spatial arrangement. There is no limitation on specific feed.

It should be further noted that similar terms "first", "second", "third", "fourth", and the like in this application do not have a substantive meaning, and are merely used to distinguish between things or concepts of a same category. In this application, many letters are used to indicate a quantity or an indication. Because applicable letters are limited, some letters may be reused in different embodiments. A meaning of a letter is subject to a meaning of a specific embodiment in which the letter is used.

The embodiments of this application provide a CSI-based location sensing method and apparatus, and a CSI-based positioning method and apparatus. Possible application scenarios are as follows:

In a home IoT scenario, more households have at least three smart home devices (such as a router, a smart TV, a smart refrigerator, and a smart lamp) that have CSI-supported wireless communication functions (such as Wi-Fi, ZigBee, and Bluetooth protocols). According to the CSI-based location sensing method and apparatus provided in the embodiments of this application, a location layout including at least three smart home devices in a household can be constructed without being perceived by a user. In addition, according to the CSI-based positioning method and apparatus provided in the embodiments of this application, a device or a user carring device which entered the location layout may be positioned, and a corresponding service may be provided based on a location. For example, when a hostess carrying a smartphone approaches a smart refrigerator, the smart refrigerator displays a status of food materials on a display screen. In the home IoT scenario, geographical locations of the smart home devices are usually not required. Only relative locations of the devices in the overall location layout need to be obtained to implement personalized and diversified services. Therefore, the smart home location layout constructed by using the CSI-based location sensing method and apparatus provided in the embodiments of this application may be the relative locations of the smart home devices, and a positioning result is also a relative location of a to-be-positioned target device in the smart home location layout. It should be noted that, in addition to the CSI-supported wireless communication function, the smart home device used to construct the location layout needs to meet a hardware requirement of having at least three antennas arranged in a non-linear manner. The to-be-positioned target device may be a device that has no at least three antennas arranged in a non-linear manner but has the CSI-supported wireless communication function. In the home IoT scenario, the smart home devices function as APs to support positioning.

Currently, a large quantity of APs are deployed in a public place (for example, a shopping mall). In a conventional method, before these APs are used for positioning, locations of the APs need to be manually calibrated, and antenna array directions of the APs need to be obtained. According to the CSI-based location sensing method and apparatus provided in the embodiments of this application, relative locations of APs can be obtained without a large amount of manual calibration and antenna array direction parameters of the APs. In other words, a location layout of the plurality of APs that can be used for positioning is constructed. A positioning result is a relative location of a to-be-positioned target in the location layout. In practice, geographical locations of a few APs may alternatively be obtained, and geographical locations of all APs or some APs in a location layout that is obtained based on relative locations of the APs, so as to provide an geographical location positioning service. This can greatly reduce workload of manually calibrating AP locations because only the geographical locations of the few APs need to be obtained.

Similarly, the embodiments of this application provide a CSI-based location sensing method and apparatus, to construct a location layout of other devices that meet the hardware requirement, for example, a location layout of base stations. The location layout may be further used to check whether a location of a device changes. For example, an updated location may be obtained at a specific frequency or irregularly by using the CSI-based location sensing method and apparatus provided in the embodiments of this application, so as to detect, through comparison, devices whose locations are abnormal. A specific application scenario indication does not constitute any limitation on a specific technical solution of this application, and details are not described herein. In summary, the embodiments of this application provide a CSI-based location sensing method and apparatus that can be applied to the location sensing field, and provide a CSI-based position method and apparatus that can be applied to the positioning field.

In this application, a device that is configured with at least three antennas arranged in a non-linear manner is frequently mentioned. Actually, antennas in more devices configured with the antennas are arranged in a non-linear manner. An embodiment of this application provides an antenna layout evaluation method, to describe advantages of the non-linear antenna arrangement in the positioning field. Non-linear antenna arrangement is used for supporting positioning devices both in the CSI-based location sensing method and the CSI-based positioning method provided in this application. For ease of understanding, the following uses an AP as an example, and specific content of the antenna layout evaluation method is as follows:

For an AP configured with M antennas, assuming that a phase difference between any two antennas i and j is denoted as $\phi_{ij}$, phase differences (Phase Difference) between all the antennas of the AP may constitute a set $\mathcal{R}$, or may constitute an antenna phase difference set, where $\mathcal{R} = \{\phi_{ij} | i, j < M, i \neq j\}$. For a given AoA whose value is $\theta$, where $\theta$ may indicate an included angle between a signal direction and a reference direction, and a corresponding set $\mathcal{R}_\theta$ may be obtained.

As shown in FIG. 1, in a case in which three antennas are linearly arranged and are spaced at an equal distance, because a distance between a to-be-positioned target and an antenna array of an AP is usually at a meter level, for any AP, a distance between different antennas of the AP is usually several centimeters, a signal from the to-be-positioned target to the antenna array of the AP may be considered as a group of parallel cables. According to a geometrical relationship, a signal arriving at an antenna 2 has an extra distance d cos θ than a signal arriving at an antenna 1. As a result, there is a phase difference $\phi_{12}$ of $$\frac{-2\pi d \cos(\theta) f}{c}$$

between the antenna 1 and the antenna 2, where f is a signal frequency, c is a speed of light, and d is a distance between the antenna 1 and the antenna 2.

$$\mathcal{R}_\theta = \{\phi_{12}, \phi_{23}, \phi_{13}\} = \left\{\frac{-2\pi d \cos(\theta) f}{c}, \frac{-2\pi d \cos(\theta) f}{c}, \frac{-4\pi d \cos(\theta) f}{c}\right\}$$

may be obtained using the same method. When $$d = k\lambda (\lambda = \frac{c}{f}$$

is wavelength of a signal), $\mathcal{R}_\theta$ may be denoted as $\{-2\gamma\pi d \cos(\theta), -2\gamma\pi d \cos(\theta), -4\gamma\pi d \cos(\theta)\}$.

Figure 2:
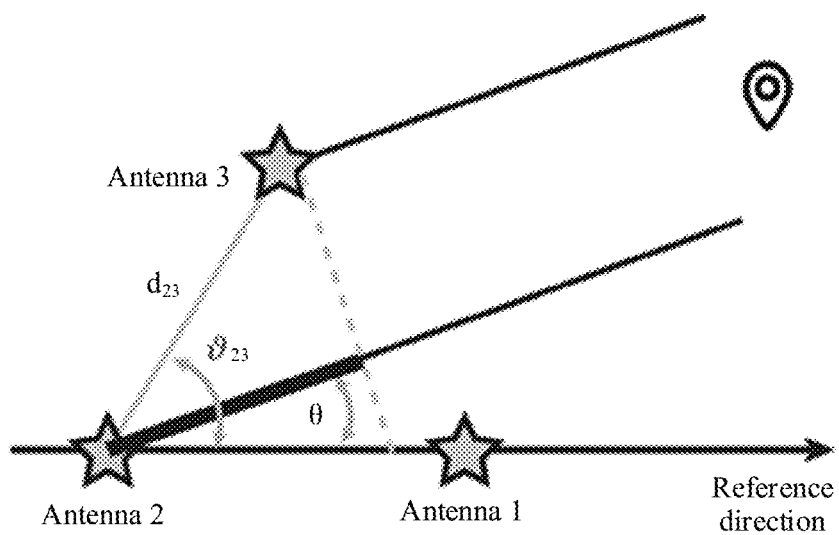
FIG. 2 is a schematic diagram of non-linear arrangement of three antennas according to an embodiment of this application.

As shown in FIG. 2, in a case in which three antennas are arranged in a non-linear manner, an equilateral triangle is used as an example herein. Similarly, $\mathcal{R}$ may be denoted as $\{-2\gamma\pi d_{12} \cos(\theta-\vartheta_{12}), -2\gamma\pi d_{23} \cos(\theta-\vartheta_{23}), -2\gamma\pi d_{13} \cos(\theta-\vartheta_{13})\}$, where $d_{12}$ indicates the distance between the antenna 1 and the antenna 2, $\vartheta_{12}$ indicates an included angle between a connection cable direction of the antenna 1 and the antenna 2 and a reference direction, $d_{13}$ indicates a distance between the antenna 1 and an antenna 3, $\vartheta_{13}$ indicates an included angle between a connection cable direction of the antenna 1 and the antenna 3 and the reference direction, $d_{23}$ indicates a distance between the antenna 2 and the antenna 3, and $\vartheta_{23}$ indicates an included angle between a connection cable direction of the antenna 2 and the antenna 3 and the reference direction.

In the foregoing description, a linear arrangement layout may be considered as a special case of a non-linear arrangement layout. The three antennas are in a same straight line, and the antennas 1, 2, and 3 are spaced at an equal distance. Therefore, d13=2d12=2d23. Similarly, the three antennas are in a same straight line. Therefore, $\vartheta_{12}=\vartheta_{13}=\vartheta_{23}=0$. A method for representing a linear antenna can be obtained by substituting them into a formula corresponding to non-linear arrangement.

Any two elements $\mathcal{R}_{\theta_1}$ and $\mathcal{R}_{\theta_2}$ indicate a set of all antenna phase differences in APs corresponding to two different given AoAs, and a Euclidean distance between them is defined as:

$$D(\mathcal{R}_{\theta_1}, \mathcal{R}_{\theta_2}) = \sum_{i \neq j} (\phi_{ij}(\theta_1) - \phi_{ij}(\theta_2))^2$$

Figure 3:
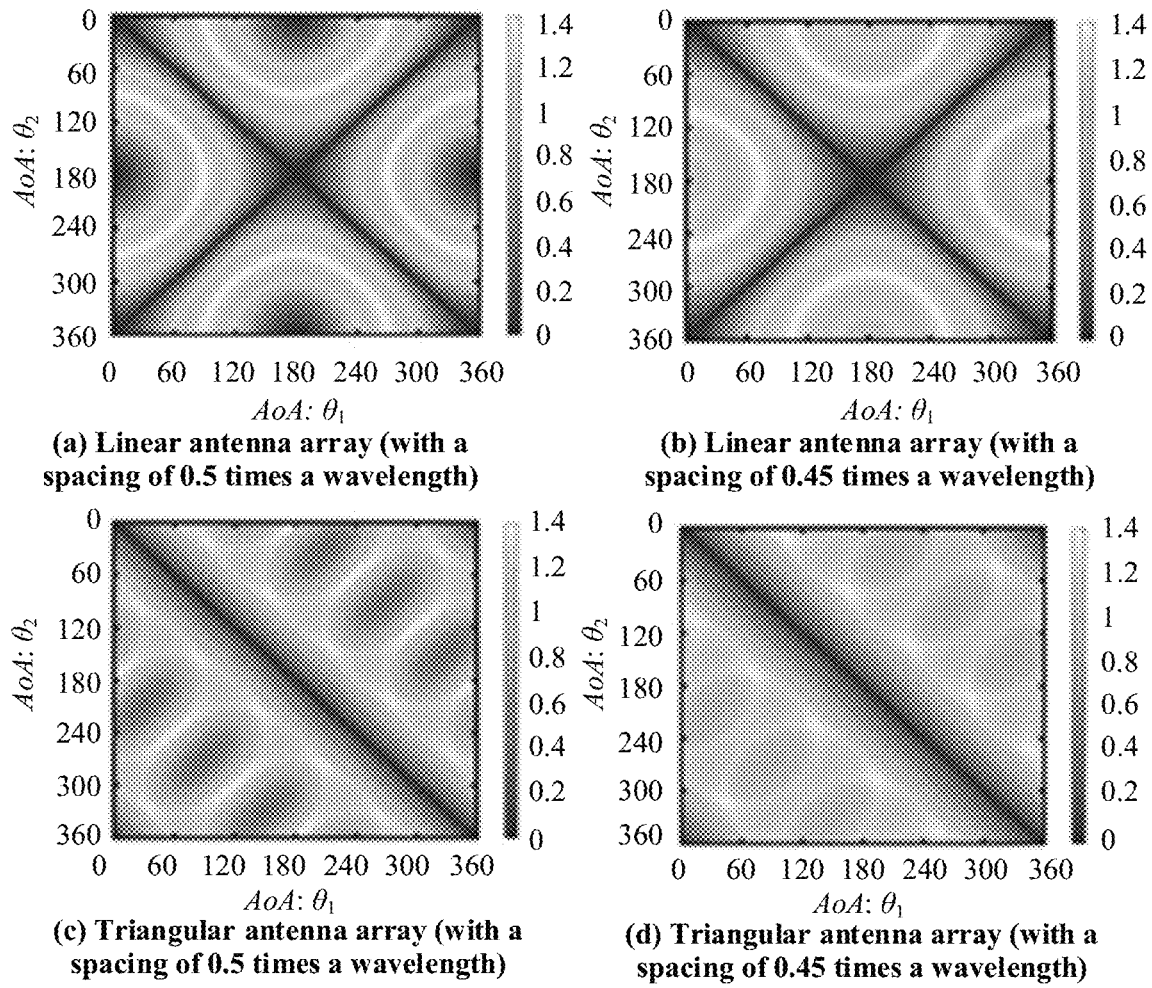
FIG. 3 is a schematic diagram of a heat map according to an embodiment of this application.

Any different AoA combinations are selected from a range of 0~360 degrees and used as $\theta_1$ and $\theta_2$. A Euclidean distance between $\theta_1$ and $\theta_2$ is calculated to obtain $(\theta_1, \theta_2, D(\mathcal{R}_{\theta_1}, \mathcal{R}_{\theta_2}))$. $(\theta_1, \theta_2)$ are used as a horizontal coordinate and a vertical coordinate respectively, to obtain a heat map shown in FIG. 3. Values on the heat map indicate whether AoAs corresponding to the horizontal and vertical coordinates are easy to distinguish. A smaller value (deeper color) on the heat map indicates that it is more difficult to distinguish the two AoAs corresponding to the horizontal and vertical coordinates. Ideally, a smaller value is observed only if horizontal and vertical coordinates are the same.

FIG. 3(a) shows a heat map when an antenna spacing is 0.5 times a wavelength in a linear antenna layout. The following can be observed: 1. A small value can be observed at any (0, 360-θ). Therefore, θ and 360-θ cannot be distinguished by using the linear antenna layout. This is a symmetry error. 2. A small value can be observed at (0, 180). Therefore, 0 degrees and 180 degrees cannot be distinguished. This is a periodicity error.

When the antenna spacing is changed to 0.45 times the wavelength, the periodic error is resolved, but there is still symmetry, as shown in FIG. 3(b). When an equilateral triangle layout is used, FIG. 3(c) and FIG. 3(d) may be obtained. It may be found that an effect is the best when the equilateral triangle layout is used and the antenna spacing is 0.45 times the wavelength. The foregoing uses the linear antenna layout and the equilateral triangle layout as an example. An effect of another layout in which the antennas configured for the AP are arranged in a non-linear manner may also be evaluated by using the foregoing antenna layout evaluation method. The antenna layout evaluation method may indicate an advantage of the non-linear antenna arrangement layout in the positioning field, where the advantage is the periodicity error and the symmetry in the linear antenna layout can be resolved.

Figure 4:
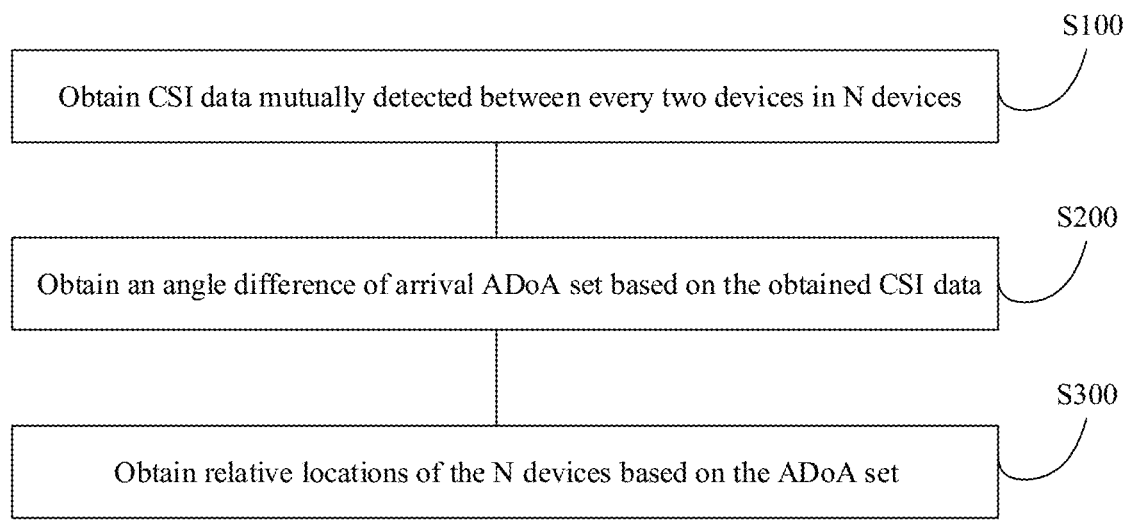
FIG. 4 is a flowchart of a CSI-based location sensing method according to an embodiment of this application.

An embodiment of this application provides a CSI-based location sensing method. A cloud server is used as an example. As shown in FIG. 4, the location sensing method includes the following specific steps.

S100: The server obtains CSI data mutually detected between every two devices in N devices, where N is an integer greater than or equal to 3, M antennas in a non-linear layout are configured for each device, in other words, the M antennas are arranged in a non-linear manner. Optionally, if M is 3, three antennas are arranged in an equilateral triangle.

During specific implementation, wireless communication can be performed between devices. For example, the devices support Wi-Fi, ZigBee, and Bluetooth protocols. Hardware of each device allows obtaining of CSI in a communication process. For example, each device is configured with an Intel 5300 network interface card. The N devices collect CSI data for each other in the communication process, summarize the CSI data collected by each other, and send the CSI data to the server.

In this application, the CSI may be denoted in a form of $Ae^{j\varphi}$, where A indicates an amplitude of channel attenuation, φ indicates a phase change (phase for short) of a signal on a channel, e indicates an Euler number, and j indicates an imaginary number. Values of phases are distributed within a range [0,2π]. For a device for which a plurality of antennas are installed, CSI may be obtained for each antenna. It should be noted that CSI and CSI data in this application are essentially the same, and refer to CSI obtained by parsing a signal.

S200: The server obtains an angle difference of arrival (ADoA) set based on the obtained CSI data, where the ADoA set includes an ADoA of every two devices in the N devices relative to each of the other devices, and the ADoA is a difference between angles of arrival AoAs of the two devices relative to a same device. Specifically, in this embodiment of this application, because there are N devices, it can be learned, according to a mathematical formula, that the ADoA set should include $C_N^2$ ADoAs.

S300: The server obtains relative locations of the N devices based on the ADoA set. In this embodiment of this application, the relative locations of the N devices are obtained, in other words, a location layout of the N devices is constructed. In theory, any one of the devices is mapped to a map, for example, a Baidu map, with an geographical location. The N devices may be mapped to a map with geographical locations based on the relative locations of the N devices. In other words, geographical locations of the N devices may be obtained. During specific implementation, geographical locations of at least three devices are usually obtained, and geographical locations of other devices are further obtained based on the obtained geographical locations of the at least three devices and the relative locations of the N devices.

Step S200 is one of important steps of the CSI-based location sensing method provided in this embodiment of this application. As described in the background, CSI directly collected when a down-sampling phase difference is unknown cannot be used to calculate an AoA. A main objective of this step is to provide a new method for representing a geometrical relationship between devices when a down-sampling phase difference is unknown. In other words, ADoA is used. A main function of the step S200 is to use technical solutions such as spectrum analysis and clustering to calculate an ADoA based on collected CSI, to further obtain an ADoA set. Herein, an ADoA of a device B relative to a device A and an ADoA of a device C relative to the device A in the N devices are used as an example to describe an ADoA calculation process. Apparently, the device A, the device B, and the device C are not a same device, and the two devices relative to the other device have a similar ADoA calculation process. For details, refer to a calculation process in the example.

Figure 5:
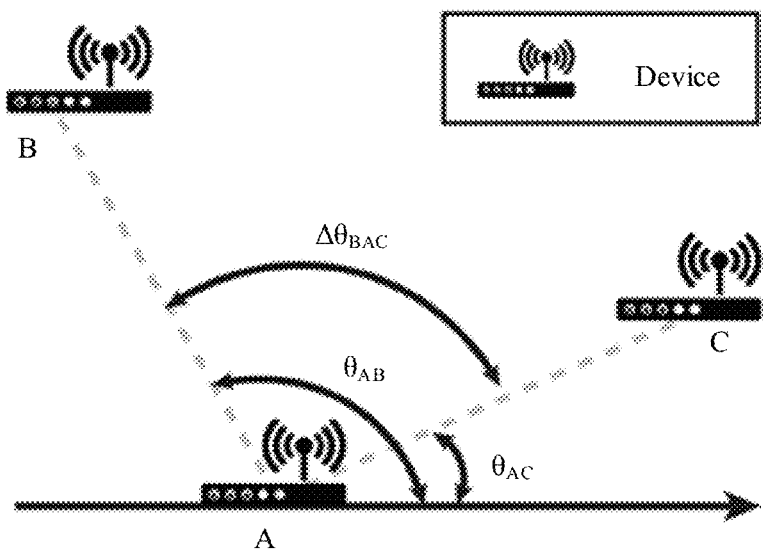
FIG. 5 is a schematic diagram of an angle difference of arrival (ADoA) according to an embodiment of this application.

For better understanding of this step, the following briefly explains an ADoA by using an example. As shown in FIG. 5, the ADoA of the device B and the device C relative to the device A are denoted as $\Delta\theta_{BAC}$, and $\Delta\theta_{BAC}$ may be obtained by subtracting $\theta_m$ from $\theta_{AB}$.

Figure 6:
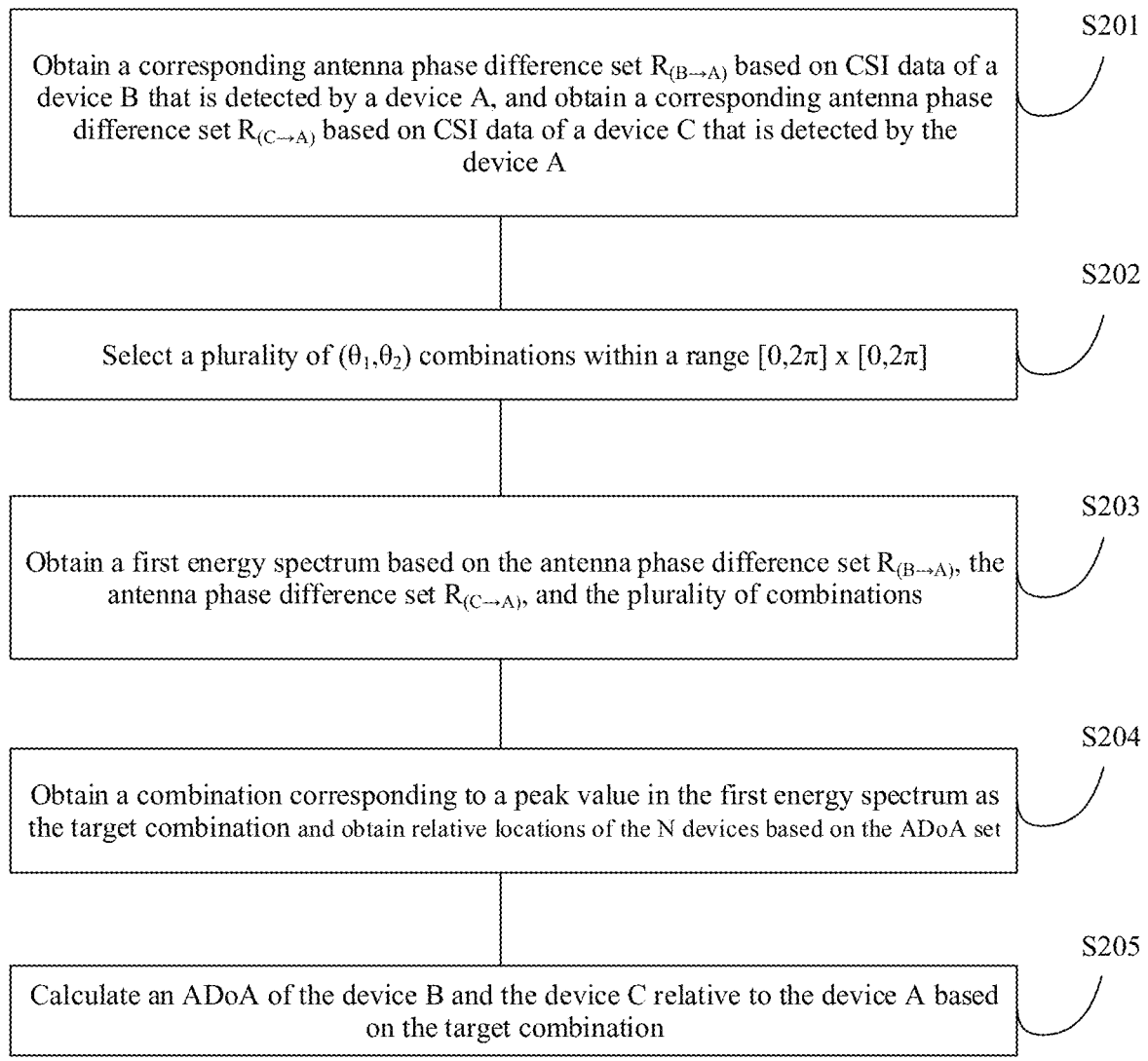
FIG. 6 is a flowchart of an ADoA calculation method according to an embodiment of this application.

As shown in FIG. 6, the step S200 specifically includes the following steps:

S201: The server obtains a corresponding antenna phase difference set denoted as $R_{(B \to A)}$ based on CSI data of the device B that is detected by the device A, and obtains a corresponding antenna phase difference set denoted as $R_{(C \to A)}$ based on CSI data of the device C that is detected by the device A, where the antenna phase difference set $R_{(B \to A)}$ is denoted as $\{\phi xy(B \to A)|x, y<M, x \neq y\}$, and $\phi xy(B \to A)$ indicates a phase difference between an $x^{th}$ antenna and a $y^{th}$ antenna of the device A in the antenna phase difference set $R_{(B \to A)}$, in other words, a phase difference that is detected by the $x^{th}$ antenna and the $y^{th}$ antenna of the device A and that corresponds to CSI of the device B; and the antenna phase difference set $R_{(C \to A)}$ is denoted as $\{\phi xy(C \to A)|x, y<M, x \neq y\}$, and $\phi xy(C \to A)$ indicates a phase difference between the $x^{th}$ antenna and the $y^{th}$ antenna of the device A in the antenna phase difference set $R_{(C \to A)}$, in other words, the phase difference that is detected by the $x^{th}$ antenna and the $y^{th}$ antenna of the device A and that corresponds to the CSI of the device C. The phase difference is affected by a distance $d_{xy}$ between the $x^{th}$ antenna and the $y^{th}$ antenna of the device A, a crossing angle $\vartheta_{ij}$ between a connection direction of the $x^{th}$ antenna and the $y^{th}$ antenna and a reference direction, and an angle of arrival $\theta$ of a signal. For the device A, the reference direction is any direction on a plane on which the M antennas of the device A are located. Optionally, all reference directions used in the process of calculating the ADoA related to the device A used as a receiving device indicate a same reference direction.

Further, the server may calculate the phase difference $\theta_{xy}$ between the $x^{th}$ antenna and the $y^{th}$ antenna of the device A according to the following formula:

$$e^{j\phi_{xy}} = \frac{e^{j\varphi_y}}{e^{j\varphi_x}}$$

where $\omega_x$ indicates a phase change $\varphi$, on a channel, of a signal in CSI data detected by the $x^{th}$ antenna of the device A, and $\varphi_y$ indicates a phase change $\varphi$, on the channel, of the signal in CSI data detected by the $y^{th}$ antenna of the device A.

S202: The server selects a plurality of $(\theta_1, \theta_2)$ combinations within a range $[0,2\pi] \times [0,2\pi]$, where $\theta_1$ and $\theta_2$ indicate included angles between a direction on the plane on which the M antennas of the device A are located and the reference direction.

S203: The server obtains a first energy spectrum based on the antenna phase difference set $R_{(B \to A)}$, the antenna phase difference set $R_{(C \to A)}$, and the plurality of combinations of $(\theta_1, \theta_2)$, where each value in the first energy spectrum corresponds to one $(\theta_1, \theta_2)$ combination and indicates a possibility that the corresponding $(\theta_1, \theta_2)$ combination is a target $(\theta_1, \theta_2)$ combination; and the target $(\theta_1, \theta_2)$ combination indicates a combination of the AoA of the device B and the device C relative to the device A. In other words, $\theta_1$ in the target $(\theta_1, \theta_2)$ combination is $\theta_{AB}$ mentioned above, and $\theta_2$ is $\theta_{AC}$.

Optionally, the server calculates, according to the following formula, a value in the first energy spectrum corresponding to a $(\theta_1, \theta_2)$ combination:

$$\frac{1}{P(\theta_1, \theta_2)} = \sum_{x \neq y} \left| \frac{e^{j\phi_{xy}(B \to A)} \, e^{j2\pi d_{xy} \cos(\vartheta_{xy} - \theta_1)f/c}}{e^{j\phi_{xy}(C \to A)} \, e^{j2\pi d_{xy} \cos(\vartheta_{xy} - \theta_2)f/c}} - 1 \right|$$

where $P(\theta_1, \theta_2)$ indicates the value in the first energy spectrum, $d_{xy}$ indicates a distance between the $x^{th}$ antenna and the $y^{th}$ antenna of the device A, $\vartheta_{xy}$ indicates an included angle between a connection direction of the $x^{th}$ antenna and the $y^{th}$ antenna of the device A and the reference direction, f is a frequency of a signal, c is a speed of light, e indicates an Euler number, and j indicates an imaginary number.

S204: The server obtains a $(\theta_1, \theta_2)$ combination corresponding to a peak value in the first energy spectrum as the target $(\theta_1, \theta_2)$ combination.

Figure 7:
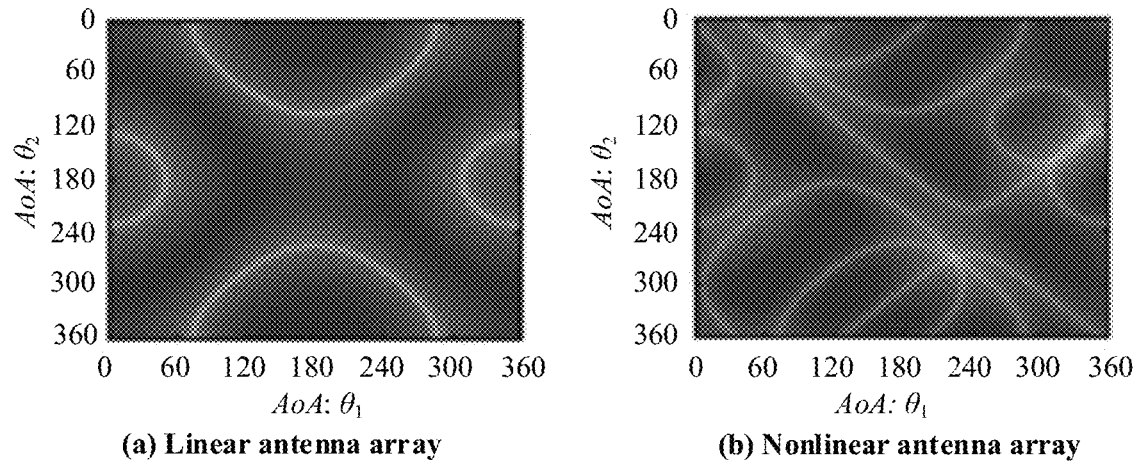
FIG. 7 is another energy spectrum diagram according to an embodiment of this application.

The following uses an example in which the device A is configured with three antennas arranged in a non-linear manner (in other words, a non-linear antenna is used), to describe how to determine unique $(\theta_1, \theta_2)$ as a target $(\theta_1, \theta_2)$ combination through an energy spectrum. In an energy spectrum shown in FIG. 7, $(\theta_1, \theta_2)$ are used as a horizontal coordinate, and corresponding $P(\theta_1, \theta_2)$ indicates luminance of a point in the spectrum. A larger value indicates higher luminance of the corresponding point. If the three antennas are linearly arranged, in other words, a linear antenna array is used, an energy spectrum shown in (a) in FIG. 7 includes unlimited points with similar high luminance. In other words, the energy spectrum has innumerable peak values, and there are innumerable possible $(\theta_1, \theta_2)$ combinations. It should be noted that P(θ₁, θ₂) corresponding to a peak value is not a largest value, but a maximal value. In this embodiment of this application, the antennas configured for the device A are arranged in a non-linear manner. In an energy spectrum shown in FIG. 7(b), there are limited points with similar high luminance. In other words, the energy spectrum has limited peak values, and there are limited possible (θ₁, θ₂) combinations.

As shown in FIG. 7(b), during specific implementation, there are a plurality of high luminance points (white crosspoints in the figure). Therefore, a plurality of (θ₁, θ₂) combinations may still be obtained. For different quantities of peak values, two methods may be used to determine the target (θ₁, θ₂) combination.

If the first energy spectrum has two peak values, the server obtains a (θ₁, θ₂) combination corresponding to either of the two peak values as the target (θ₁, θ₂).

If the first energy spectrum has at least two peak values, and N is an integer greater than or equal to 4, in other words, the N devices are at least four devices, S204 further includes:

S2041: The server obtains a first down-sampling phase difference set of a (θ₁, θ₂) combination corresponding to each peak value, where one (θ₁, θ₂) combination corresponds to one first down-sampling phase difference set.

If a first down-sampling phase difference set of a (θ₁, θ₂) combination corresponding to any peak value is denoted as $\{\phi_{xy}^{Down}|x, y<M, x\neq y\}$, $\phi_{xy}^{Down}$ is calculated according to the following formula:

$$\phi_{xy}^{Down} = \phi_{xy(B\to A)} + 2\pi d_{xy} \cos(\vartheta_{xy} + \theta_1)f/c, \text{ or}$$

$$\phi_{xy}^{Down} = \phi_{xy(C\to A)} + 2\pi d_{xy} \cos(\vartheta_{xy} + \theta_2)f/c, \text{ or}$$

$$\phi_{xy}^{Down} = \left(\left(\phi_{xy(B\to A)} + \frac{2\pi d_{xy} \cos(\vartheta_{xy} + \theta_1)f}{c}\right) + \left(\phi_{xy(C\to A)} + \frac{2\pi d_{xy} \cos(\vartheta_{xy} + \theta_2)f}{c}\right)\right)/2$$

where $d_{xy}$ indicates the distance between the x$^{th}$ antenna and the y$^{th}$ antenna of the device A, $\vartheta_{xy}$ indicates the included angle between the connection direction of the x$^{th}$ antenna and the y$^{th}$ antenna of the device A and the reference direction, f is the frequency of the signal, c is the speed of light.

S2042: The server obtains, based on the first down-sampling phase difference set and by using a clustering method, the target (θ₁, θ₂) from (θ₁, θ₂) combinations corresponding to all peak values.

The specific steps are as follows:

(1) The server obtains a second down-sampling phase difference set of a (θ₁, θ₃) combination corresponding to each peak value in a second energy spectrum.

Figure 8:
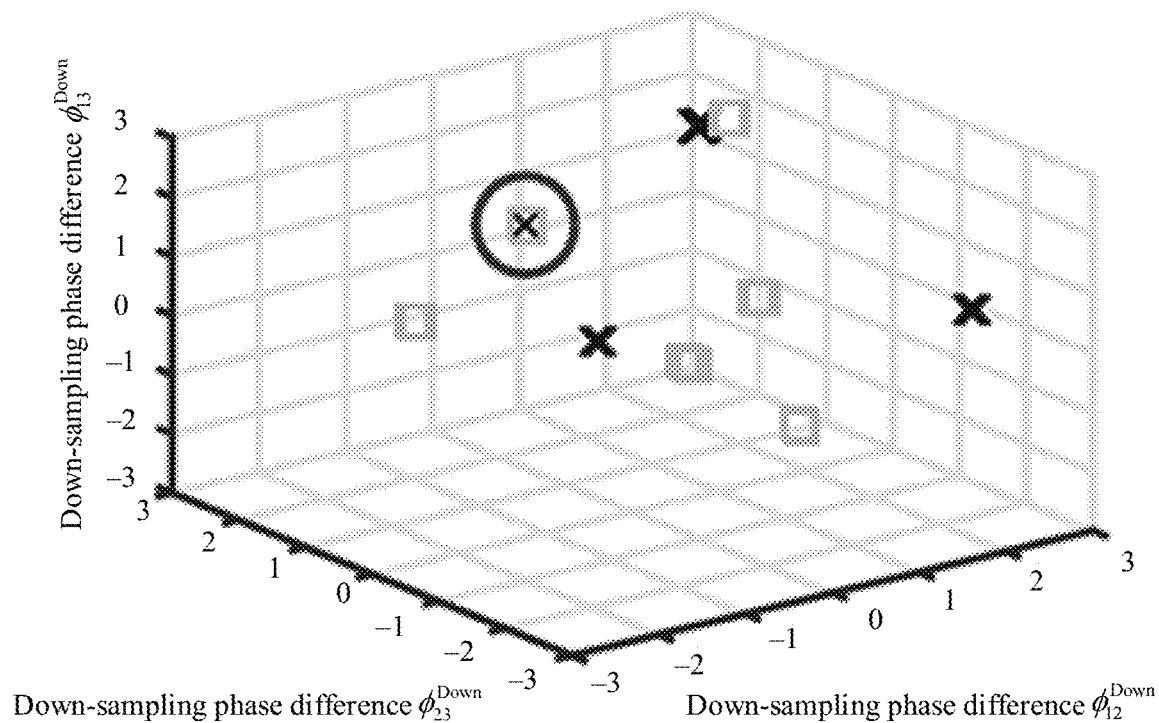
FIG. 8 is a schematic diagram of representing $(\theta_1, \theta_2)$ in a coordinate system according to an embodiment of this application.

(2) In a same coordinate system, separately using the first down-sampling phase difference set and the second down-sampling phase difference set as coordinates, the server obtains a (θ₁, θ₂) combination corresponding to a first down-sampling phase difference set corresponding to a coordinate point closest to a coordinate point corresponding to the second down-sampling phase difference set, and uses the (θ₁, θ₂) combination as the target (θ₁, θ₂) combination. This step is also a clustering process. To better describe this step, an example in which the device A is configured with three non-linear antennas is still used. As shown in FIG. 8, three down-sampling phase differences in the following sampling phase difference set are respectively coordinates in three directions: a horizontal direction, a vertical direction, and a perpendicular direction. Points corresponding to a (θ₁, θ₂) combination and a (θ₁, θ₃) combination are drawn in a coordinate system. Different marks in the figure indicate different ADoAs. As shown in the figure, a cross indicates a (θ₁, θ₂) combination, a block indicates a (θ₁, θ₃) combination, and a (θ₁, θ₂) combination corresponding to points that have different marks and that overlap or are closest to each other is a target (θ₁, θ₂) combination that needs to be obtained.

The second energy spectrum is relative to a device D, the device B, and the device A. A specific method for obtaining the second energy spectrum is the same as a method for obtaining the first energy spectrum. The difference lies in that the device C is replaced with the device D, in other words, data related to the device C in the process is replaced with data related to the device D. For detailed steps of the second energy spectrum, refer to the steps of obtaining the first energy spectrum.

To describe the second energy spectrum more clearly, the following briefly describes the steps of obtaining the second energy spectrum.

(1) The server obtains a corresponding antenna phase difference set denoted as $R_{(D\to A)}$ based on CSI data of the device D that is detected by the device A, where the antenna phase difference set $R_{(D\to A)}$ is denoted as $\{\phi_{xy(D\to A)}|x, y<M, x\neq y\}$, and $\phi_{xy(D\to A)}$ indicates a phase difference between the x$^{th}$ antenna and the y$^{th}$ antenna of the device A in the antenna phase difference set $R_{(D\to A)}$, in other words, a phase difference that is detected by the x$^{th}$ antenna and the y$^{th}$ antenna of the device A and that corresponds to CSI of the device B; and the device D is any one of the N devices and is not the same device as the device A, the device B, and the device C.

(2) The server selects a plurality of (θ₁, θ₃) combinations within the range [0,2π]×[0,2π], where θ₁ and θ₃ indicate the included angles between the direction on the plane on which the M antennas of the device A are located and the reference direction.

(3) The server obtains the second energy spectrum based on the antenna phase difference set $R_{(B\to A)}$, the antenna phase difference set $R_{(D\to A)}$, and the plurality of (θ₁, θ₃) combinations, where each value in the second energy spectrum corresponds to one (θ₁, θ₃) combination.

The value that is in the second energy spectrum and that corresponds to a (θ₁, θ₃) combination is calculated according to the following formula:

$$\frac{1}{P(\theta_1, \theta_3)} = \sum_{x\neq y}\left|\frac{e^{j\phi_{xy(B\to A)}}}{e^{j\phi_{xy(D\to A)}}} \frac{e^{j2\pi d_{xy} \cos(\vartheta_{xy}-\theta_1)f/c}}{e^{j2\pi d_{xy} \cos(\vartheta_{xy}-\theta_3)f/c}} - 1\right|$$

where P(θ₁, θ₃) indicates the value in the second energy spectrum, $d_{xy}$ indicates the distance between the x$^{th}$ antenna and the y$^{th}$ antenna of the device A, $\vartheta_{xy}$ indicates the included angle between the connection direction of the x$^{th}$ antenna and the y$^{th}$ antenna of the device A and the reference direction, f is the frequency of the signal, c is the speed of light, e indicates the Euler number, and j indicates the imaginary number.

Similarly, the step of calculating the second down-sampling phase difference set is also similar to the step of calculating the first down-sampling phase difference set, and corresponding parameters indicated by the second down-sampling phase difference set are different from those indicated by the first down-sampling phase difference set. Details are not described herein again.

It should be noted that a sequence of obtaining the first energy spectrum, the second energy spectrum, the first down-sampling phase difference set, and the second down-sampling phase difference set is not limited. During specific implementation, the device A, the device B, and the device C mentioned in the step S200 are any one of the N devices. In other words, related steps of the process of calculating the ADoA of the device B and the device C relative to the device A may be considered as related steps of the process of calculating the ADoA of the device B and the device D relative to the device A.

S205: The server calculates the ADoA of the device B and the device C relative to the device A based on the target ($\theta_1$, $\theta_2$) combination.

It can be learned from the foregoing description corresponding to FIG. 5 that the server may calculate the ADoA of the device B and the device C relative to the device A according to the following formula:

$$\Delta\theta_{(BAC)} = |\theta_{1\ target} - \theta_{2\ target}|$$

where $\Delta\theta_{(BAC)}$ indicates the ADoA of the device B and the device C relative to the device A, and $\theta_{1\ target}$, $\theta_{2\ target}$ are respectively $\theta_1$, $\theta_2$ in the target ($\theta_1$, $\theta_2$) combination.

Further, the server may obtain the ADoA of the device B and the device D relative to the device A based on a ($\theta_1$, $\theta_3$) combination corresponding to the second down-sampling phase difference set corresponding to the coordinate point closest to the coordinate point corresponding to the target ($\theta_1$, $\theta_2$) combination.

Further, the server may obtain the ADoA of the device C and the device D relative to the device A based on $\theta_2$ in the target ($\theta_1$, $\theta_2$) combination and based on $\theta_3$ in a ($\theta_1$, $\theta_3$) combination corresponding to the second down-sampling phase difference set corresponding to the coordinate point closest to the coordinate point corresponding to the target ($\theta_1$, $\theta_2$) combination.

If N is 3, the step S300 is specifically as follows: The server directly obtains the relative locations of the three devices based on a geometrical relationship between the ADoAs of the three devices.

If N is greater than 3, the step S300 specifically includes the following steps:

Step A: The server randomly selects at least three devices from the N devices.

Step B: The server obtains, from the ADoA set, an ADoA of every two devices in the at least three devices relative to each of the other devices.

Step C: The server constructs relative locations of the at least three devices based on the ADoA of every two devices in the at least three devices relative to each of the other devices. In other words, the server obtains relative location relationships of the at least three devices based on an ADoA set relationship between every two of the at least three devices. During specific implementation, usually three devices are obtained from the N devices. The relative locations of the three devices are first obtained, and the following steps are performed based on the relative locations of the three devices.

Step D: The server obtains an ADoA related to a device Q from the ADoA set to form a set E, where the device Q is any one of the N devices and is not the same device as the at least three devices, the set E includes the ADoA of every two devices in the at least three devices relative to the device Q, and an ADoA of the device Q and each of the at least three devices relative to each of the other devices in the at least three devices.

Step E: The server obtains relative locations between the device Q and the at least three devices based on the set E and the relative locations of the at least three devices.

Repeat step D and step E until the relative locations of all the N devices are obtained.

Further, the step E specifically includes:

The server selects a plurality of evaluation locations of the device Q based on the relative locations of the at least three devices, where the evaluation locations indicate to-be-determined relative locations between the device Q and the at least three devices.

The server calculates error values based on the set E and a plurality of evaluation ADoA sets corresponding to the plurality of evaluation locations, where the plurality of evaluation locations one-to-one correspond to the plurality of evaluation ADoA sets, ADoAs in each evaluation ADoA set one-to-one correspond to ADoAs in the set E, and one evaluation ADoA set corresponds to one error value.

The server obtains the relative locations between the device Q and the at least three devices based on an evaluation location corresponding to a target evaluation ADoA set, where the target evaluation ADoA set is an evaluation ADoA set that is in the plurality of evaluation ADoA sets and that corresponds to a smallest error value.

Specifically, the server may calculate the error value according to the following formula:

$$e = \sum_{\substack{\Delta\theta \in E \\ \Delta\theta' \in F}} (\Delta\theta - \Delta\theta')^2$$

where E indicates the set E, $\Delta\theta$ indicates the ADoA in E, F indicates any one of the plurality of evaluation ADoA sets, $\Delta\theta'$ indicates an ADoA corresponding to $\Delta\theta$ in F, and e indicates an error value corresponding to F.

Optionally, the step E specifically includes:

The server calculates, according to the following formula, the evaluation location corresponding to the target evaluation ADoA set:

$$L_Q = \arg\min_{L \in G} \sum_{\substack{\Delta\theta \in E \\ \Delta\theta' \in F_L}} (\Delta\theta - \Delta\theta')^2$$

where $L_Q$ indicates the evaluation location corresponding to the target evaluation ADoA set, G indicates the plurality of evaluation locations, L indicates any evaluation location in G, E indicates the set E, $\Delta\theta$ indicates the ADoA in E, $F_L$ indicates an evaluation ADoA set corresponding to L, and $\Delta\theta'$ indicates an ADoA corresponding to $\Delta\theta$ in F.

Figure 9:
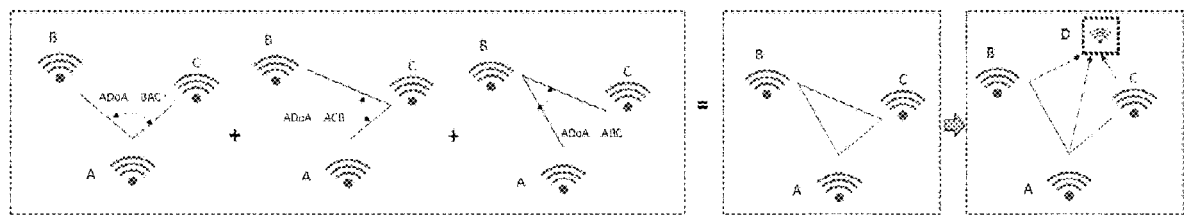
FIG. 9 is a schematic diagram of a location layout of a device according to an embodiment of this application.

The following uses an example to describe how to use different ADoAs to obtain the relative locations of the devices in this step. As shown in FIG. 9, for the three devices A, B, and C, the ADoAs $\Delta\theta_{BAC}$, $\Delta\theta_{ACB}$, and $\Delta\theta_{ABC}$ (shown on the left side of the equation in the following figure) are first obtained by using the step S200, and a corresponding triangle layout is constructed by using three angles of a triangle.

For each element $\mathcal{M} \in E$, a measured ADoA is defined as $\Delta\theta_M$. A construction error e is calculated as follows:

$$e = \sum_{M \in E} (\Delta\theta_M - \Delta\hat{\theta}_M)^2$$

where $\Delta\hat{\theta}_M$ indicates an ADoA corresponding to an evaluation location. A relative location between the device D and the devices A, B, and C may be determined based on the smallest e obtained according to the foregoing formula.

When there are more devices, repeat the foregoing two steps to calculate locations of other devices.

If another device D is added to a system, as shown in the second part on the right of the foregoing equation, find all ADoAs related to the device D in the obtained ADoA set to obtain the set E, ED={ABD, ACD, ADB, ADC, BAD, BCD, BDA, BDC, CAD, CBD, CDA, CDB}.

Optionally, the CSI-based location sensing method provided in this embodiment of this application further includes the following steps.

S400: Obtain geographical locations of any W devices in the N devices, where W is an integer greater than or equal to 3.

S500: Obtain an geographical location of each of the N devices based on the geographical locations of the W devices and the relative locations of the N devices.

According to the CSI-based location sensing method provided in this embodiment of this application, relative locations of a plurality of devices can be obtained without a large amount of manual calibration and antenna array direction parameters of APs. In other words, a location layout of the plurality of devices that can be used for positioning is constructed. When the location layout obtained according to the foregoing method is used for positioning, a positioning result is a relative location of a to-be-positioned target in the location layout. Even if an geographical location of the to-be-positioned target is expected to be obtained, the APs are used as an example, in the foregoing CSI-based location sensing method, geographical locations of a few APs may also be obtained, to obtain geographical locations of all the APs in the location layout based on relative locations of a plurality of APs, so as to provide a positioning service for an geographical location. This also greatly reduces workload of manual AP location calibration. The CSI-based location sensing method may be considered as a self-calibration mechanism of a positioning system, which can reduce workload of manually recording an AP location and an antenna array direction. An ADoA concept is proposed. The ADoA can be obtained if an AP location, an antenna array direction, and phase offset are unknown, and an overall AP location layout is obtained based on the ADoA. The positioning system includes N devices and one or more servers and can be used to provide a positioning service.

Optionally, antennas configured for each of the N devices are arranged in a triangle, in other words, in a triangular antenna layout. A test result shows that in any direction, 80% of an angle of arrival (AoA) can be measured in the triangular antenna layout, and a measurement error is within 9°. Compared with this layout, a measurement error of a linear antenna layout is 16°. The CSI-based location sensing method does not require large-scale onsite calibration, but can still reach precision that can be achieved by using a large-scale onsite calibration method. 80% of positioning errors are within 0.60 m.

It should be noted that the server performing the foregoing method is used as an example in this embodiment of this application. The CSI-based location sensing method provided in this embodiment of this application may be performed by a third-party device (for example, the location sensing apparatus 1000 or an apparatus 3000 in the following embodiments) independent of the N devices. For example, a cloud server or any one of the N devices may perform the foregoing method in this embodiment of this application. This is not limited herein.

Figure 10:
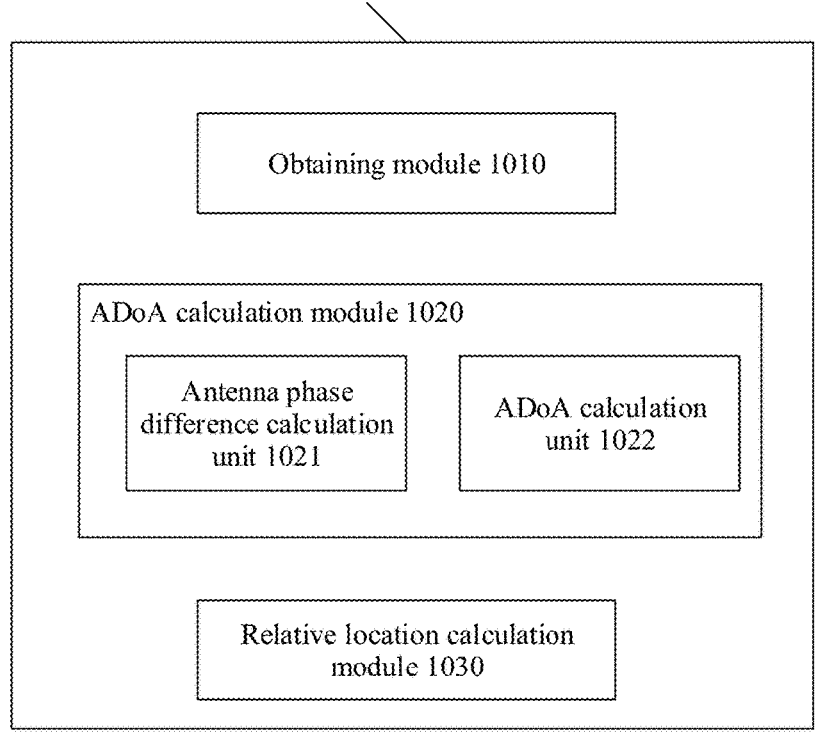
FIG. 10 is a block diagram of a location sensing apparatus according to an embodiment of this application.

An embodiment of this application provides a location sensing apparatus 1000. The location sensing apparatus 1000 is configured to perform the CSI-based location sensing method described in the embodiment corresponding to FIG. 4 to FIG. 9. As shown in FIG. 10, the location sensing apparatus 1000 includes an obtaining module 1010, an ADoA calculation module 1020, and a relative location calculation module 1030.

The obtaining module 1010 is configured to obtain CSI data mutually detected between every two devices in N devices, where N is an integer greater than or equal to 3, M antennas arranged in a non-linear manner are configured for each device, M is an integer greater than or equal to 3. Optionally, the M antennas are arranged in an equilateral triangle.

The ADoA calculation module 1020 is configured to obtain an angle difference of arrival (ADoA) set based on the CSI data obtained by the obtaining module 1010, where the ADoA set includes an ADoA of every two devices in the N devices relative to each of the other devices, and the ADoA is a difference between angles of arrival AoAs of the two devices relative to a same device.

The relative location calculation module 1030 is configured to obtain relative locations of the N devices based on the ADoA set obtained by the ADoA calculation module 1020. Actually, if the ADoAs corresponding to the N devices are known, the relative locations of the N devices may be constructed according to a geometrical relationship.

Further, the ADoA calculation module 1020 includes an antenna phase difference calculation unit 1021 and an ADoA calculation unit 1022.

The antenna phase difference calculation unit 1021 is configured to obtain a corresponding antenna phase difference set $R_{(B \to A)}$ based on CSI data of a device B that is detected by a device A, and obtain a corresponding antenna phase difference set $R_{(C \to A)}$ based on CSI data of a device C that is detected by the device A. The device A, the device B, and the device C are any one of the N devices, and the device A, the device B, and the device C are not a same device. The antenna phase difference set $R_{(B \to A)}$ is denoted as $\{\phi_{xy}(B \to A) | x, y < M, x \neq y\}$, and $\phi_{xy(B \to A)}$ indicates a phase difference between the $x^{th}$ antenna and the $y^{th}$ antenna of the device A in the antenna phase difference set $R_{(B \to A)}$. The antenna phase difference set $R_{(C \to A)}$ is denoted as $\{\phi_{xy(C \to A)} | x, y < M, x \neq y\}$, and $\phi_{xy(C \to A)}$ indicates a phase difference between the $x^{th}$ antenna and the $y^{th}$ antenna of the device A in the antenna phase difference set $R_{(C \to A)}$.

Any piece of CSI data may be denoted as $Ke^{j\varphi}$, where K indicates an amplitude of channel attenuation, φ indicates a phase change of a signal on a channel, e indicates an Euler number, and j indicates an imaginary number.

Further, the antenna phase difference calculation unit 1021 is configured to calculate the phase difference $\phi_{xy}$ between the $x^{th}$ antenna and the $y^{th}$ antenna of the device A according to the following formula:

$$e^{j\phi_{xy}} = \frac{e^{j\varphi_y}}{e^{j\varphi_x}}$$

where $\varphi_x$ indicates the phase change $\varphi$, on the channel, of the signal in CSI data detected by the $x^{th}$ antenna of the device A, and $\varphi_y$ indicates the phase change $\varphi$, on the channel, of the signal in CSI data detected by the $y^{th}$ antenna of the device A. For example, if the $x^{th}$ antenna and the $y^{th}$ antenna of the device A detect the CSI data of the device B, $\phi_{xy(B \to A)}$ may be calculated according to the foregoing formula. $\phi_{xy(B \to A)}$ is the phase difference between the $x^{th}$ antenna and the $y^{th}$ antenna of the device A in the antenna phase difference set $R_{(B \to A)}$.

The ADoA calculation unit 1022 is configured to calculate an ADoA of the device B and the device C relative to the device A based on the antenna phase difference set $R_{(B \to A)}$ and the antenna phase difference set $R_{(C \to A)}$ that are obtained by the antenna phase difference calculation unit 1021.

Specifically, the ADoA calculation unit 1022 is configured to perform the following steps:

selecting a plurality of $(\theta_1, \theta_2)$ combinations within a range $[0,2\pi] \times [0,2\pi]$, where $\theta_1$ and $\theta_2$ indicate included angles between a direction on a plane on which the M antennas of the device A are located and a reference direction, and the reference direction is any direction on the plane on which the M antennas of the device A are located;

obtaining a first energy spectrum based on the antenna phase difference set $R_{(B \to A)}$, the antenna phase difference set $R_{(C \to A)}$, and the plurality of combinations of $(\theta_1, \theta_2)$, where each value in the first energy spectrum corresponds to one $(\theta_1, \theta_2)$ combination and indicates a possibility that the corresponding $(\theta_1, \theta_2)$ combination is a target $(\theta_1, \theta_2)$ combination; and the target $(\theta_1, \theta_2)$ combination indicates a combination of the AoA of the device B relative to the device A and the AoA of the device C relative to the device A;

obtaining a $(\theta_1, \theta_2)$ combination corresponding to a peak value in the first energy spectrum as the target $(\theta_1, \theta_2)$ combination; and calculating the ADoA of the device B and the device C relative to the device A based on the target $(\theta_1, \theta_2)$ combination.

Further, the ADoA calculation unit 1022 is specifically configured to calculate, according to the following formula, a value that is in the first energy spectrum and that corresponds to each $(\theta_1, \theta_2)$ combination in the plurality of $(\theta_1, \theta_2)$ combinations:

$$\frac{1}{P(\theta_1, \theta_2)} = \sum_{x \neq y} \left| \frac{e^{j\phi_{xy(B \to A)}} \, e^{j 2\pi d_{xy} \cos(\vartheta_{xy} - \theta_1) f/c}}{e^{j\phi_{xy(C \to A)}} \, e^{j 2\pi d_{xy} \cos(\vartheta_{xy} - \theta_2) f/c}} - 1 \right|$$

where $P(\theta_1, \theta_2)$ indicates the value in the first energy spectrum, $d_{xy}$ indicates a distance between the $x^{th}$ antenna and the $y^{th}$ antenna of the device A, $\vartheta_{xy}$ indicates an included angle between a connection direction of the $x^{th}$ antenna and the $y^{th}$ antenna of the device A and the reference direction, f is a frequency of a signal, c is a speed of light, e indicates an Euler number, and j indicates an imaginary number.

Further, if the first energy spectrum has two peak values, the ADoA calculation unit 1022 is specifically further configured to obtain a $(\theta_1, \theta_2)$ combination corresponding to either of the two peak values as the target $(\theta_1, \theta_2)$. Optionally, the ADoA calculation unit 1022 may select a $(\theta_1, \theta_2)$ combination corresponding to one of the two peak values as the target $(\theta_1, \theta_2)$ by using another method.

Optionally, if the first energy spectrum has at least two peak values, and N is an integer greater than or equal to 4, the ADoA calculation unit 1022 is specifically further configured to perform the following steps:

obtaining a first down-sampling phase difference set of a $(\theta_1, \theta_2)$ combination corresponding to each peak value, where one $(\theta_1, \theta_2)$ combination corresponds to one first down-sampling phase difference set; and obtaining, based on the first down-sampling phase difference set and by using a clustering method, the target $(\theta_1, \theta_2)$ from $(\theta_1, \theta_2)$ combinations corresponding to all peak values.

If a first down-sampling phase difference set of a $(\theta_1, \theta_2)$ combination corresponding to any peak value is denoted as $\{\phi_{xy}^{Down} | x, y \leq M, x \neq y\}$, the ADoA calculation unit 1022 is configured to calculate $\phi_{xy}^{Down}$ according to the following formula:

$$\phi_{xy}^{Down} = \phi_{xy(B \to A)} + 2\pi d_{xy} \cos(\vartheta_{xy} + \theta_1) f/c, \text{ or}$$

$$\phi_{xy}^{Down} = \phi_{xy(C \to A)} + 2\pi d_{xy} \cos(\vartheta_{xy} + \theta_2) f/c, \text{ or}$$

$$\phi_{xy}^{Down} = \left( \left( \phi_{xy(B \to A)} + \frac{2\pi d_{xy} \cos(\vartheta_{xy} + \theta_1) f}{c} \right) + \left( \phi_{xy(C \to A)} + \frac{2\pi d_{xy} \cos(\vartheta_{xy} + \theta_2) f}{c} \right) \right)/2$$

where $d_{xy}$ indicates the distance between the $x^{th}$ antenna and the $y^{th}$ antenna of the device A, $\vartheta_{xy}$ indicates the included angle between the connection direction of the $x^{th}$ antenna and the $y^{th}$ antenna of the device A and the reference direction, f is the frequency of the signal, c is the speed of light.

Further, the ADoA calculation unit 1022 is configured to perform the following steps:

obtaining a second down-sampling phase difference set of a $(\theta_1, \theta_3)$ combination corresponding to each peak value in a second energy spectrum; and in a same coordinate system, separately using the first down-sampling phase difference set and the second down-sampling phase difference set as coordinates, obtaining a $(\theta_1, \theta_2)$ combination corresponding to a first down-sampling phase difference set corresponding to a coordinate point closest to a coordinate point corresponding to the second down-sampling phase difference set, and using the $(\theta_1, \theta_2)$ combination as the target $(\theta_1, \theta_2)$ combination.

Before the ADoA calculation unit 1022 obtains the second down-sampling phase difference set of the $(\theta_1, \theta_3)$ combination corresponding to each peak value in the second energy spectrum, the antenna phase difference calculation unit 1021 is further configured to obtain a corresponding antenna phase difference set $R_{(D \to A)}$ based on CSI data of a device D that is detected by the device A, where the antenna phase difference set $R_{(D \to A)}$ is denoted as $\{\phi_{xy(D \to A)} | x, y < M, x \neq y\}$, and $\phi_{xy(D \to A)}$ indicates a phase difference between the $x^{th}$ antenna and the $y^{th}$ antenna of the device A in the antenna phase difference set $R_{(D \to A)}$, and the device D is any one of the N devices and is not the same device as the device A, the device B, and the device C. The ADoA calculation unit 1022 is further configured to perform the following steps:

selecting a plurality of $(\theta_1, \theta_3)$ combinations within the range $[0,2\pi] \times [0,2\pi]$, where $\theta_1$ and $\theta_3$ indicate the included angles between the direction on the plane on which the M antennas of the device A are located and the reference direction;

obtaining the second energy spectrum based on the antenna phase difference set $R_{(B \to A)}$, the antenna phase difference set $R_{(D \to A)}$, and the plurality of $(\theta_1, \theta_3)$ combinations, where each value in the second energy spectrum corresponds to one $(\theta_1, \theta_3)$ combination; and calculating, according to the following formula, the value that is in the second energy spectrum and that corresponds to a $(\theta_1, \theta_3)$ combination:

$$\frac{1}{P(\theta_1, \theta_3)} = \sum_{x \neq y} \left| \frac{e^{j\phi_{xy}(B \to A)} \, e^{j2\pi d_{xy} \cos(\theta_{xy} - \theta_1) f/c}}{e^{j\phi_{xy}(D \to A)} \, e^{j2\pi d_{xy} \cos(\theta_{xy} - \theta_3) f/c}} - 1 \right|$$

where $P(\theta_1, \theta_3)$ indicates the value in the second energy spectrum.

Further, the ADoA calculation unit 1022 is specifically configured to calculate the ADoA of the device B and the device C relative to the device A according to the following formula:

$$\Delta\theta_{(BAC)} = |\theta_{1\,target} - \theta_{2\,target}|$$

where $\Delta\theta_{(BAC)}$ indicates the ADoA of the device B and the device C relative to the device A, and $\theta_{1\,target}$, $\theta_{2\,target}$ are respectively $\theta_1, \theta_2$ in the target $(\theta_1, \theta_2)$ combination.

The ADoA calculation unit 1022 is further configured to: calculate the ADoA of the device B and the device D relative to the device A based on a $(\theta_1, \theta_3)$ combination corresponding to the second down-sampling phase difference set corresponding to the coordinate point closest to the coordinate point corresponding to the target $(\theta_1, \theta_2)$ combination.

The ADoA calculation unit 1022 is further configured to: calculate the ADoA of the device C and the device D relative to the device A based on $\theta_2$ in the target $(\theta_1, \theta_2)$ combination and based on $\theta_3$ in a $(\theta_1, \theta_3)$ combination corresponding to the second down-sampling phase difference set corresponding to the coordinate point closest to the coordinate point corresponding to the target $(\theta_1, \theta_2)$ combination.

Further, if N is an integer greater than or equal to 4, the relative location calculation module 1030 is specifically configured to perform the following steps:

Step A: randomly select at least three devices from the N devices;

Step B: obtain, from the ADoA set obtained by the ADoA calculation module 1020, an ADoA of every two devices in the at least three devices relative to each of the other devices;

Step C: construct relative locations of the at least three devices based on the ADoA of every two devices in the at least three devices relative to each of the other devices, where it should be noted that, if N is an integer of 3, in other words, there are three devices, relative locations of the three devices may be obtained in this step, and the following steps D to E do not need to be performed;

Step D: obtain an ADoA related to a device Q from the ADoA set obtained by the ADoA calculation module 1020 to form a set E, where the device Q is any one of the N devices and is not the same device as the at least three devices, the set E includes the ADoA of every two devices in the at least three devices relative to the device Q, and an ADoA of the device Q and each of the at least three devices relative to each of the other devices in the at least three devices;

Step E: obtain relative locations between the device Q and the at least three devices based on the set E and the relative locations of the at least three devices; and repeat step D and step E until the relative locations of the N devices are obtained, in other words, an overall layout of the relative locations of the N devices are obtained.

Further, the relative location calculation module 1030 is specifically configured to: select a plurality of evaluation locations of the device Q based on the relative locations of the at least three devices, where the evaluation locations indicate to-be-determined relative locations between the device Q and the at least three devices; calculating error values based on the set E and a plurality of evaluation ADoA sets corresponding to the plurality of evaluation locations, where the plurality of evaluation locations one-to-one correspond to the plurality of evaluation ADoA sets, ADoAs in each evaluation ADoA set one-to-one correspond to ADoAs in the set E, and one evaluation ADoA set corresponds to one error value; and obtain the relative locations between the device Q and the at least three devices based on an evaluation location corresponding to a target evaluation ADoA set, wherein the target evaluation ADoA set is an evaluation ADoA set that is in the plurality of evaluation ADoA sets and that corresponds to a smallest error value.

Specifically, the relative location calculation module 1030 is configured to calculate the error value according to the following formula:

$$e = \sum_{\substack{\Delta\theta \in E \\ \Delta\theta' \in F}} (\Delta\theta - \Delta\theta')^2$$

where E indicates the set E, $\Delta\theta$ indicates the ADoA in E, F indicates any one of the plurality of evaluation ADoA sets, $\Delta\theta'$ indicates an ADoA corresponding to $\Delta\theta$ in F, and e indicates an error value corresponding to F.

Optionally, the relative location calculation module 1030 is configured to calculate, according to the following formula, the evaluation location corresponding to the target evaluation ADoA set:

$$L_Q = \arg\min_{L \in G} \sum_{\substack{\Delta\theta \in E \\ \Delta\theta' \in F_L}} (\Delta\theta - \Delta\theta')^2$$

where $L_Q$ indicates the evaluation location corresponding to the target evaluation ADoA set, G indicates the plurality of evaluation locations, L indicates any evaluation location in G, E indicates the set E, $\Delta\theta$ indicates the ADoA in E, $F_L$ indicates an evaluation ADoA set corresponding to L, and $\Delta\theta'$ indicates an ADoA corresponding to $\Delta\theta$ in $F_L$.

Optionally, the location sensing apparatus further includes an location obtaining module, configured to obtain geographical locations of any W devices in the N devices, where W is an integer greater than or equal to 3; obtain an geographical location of each of the N devices based on the geographical locations of the W devices and the relative locations of the N devices.

During specific implementation, the location sensing apparatus may be a third-party device independent of the N devices. For example, the location sensing apparatus may be a server. The location sensing apparatus may be one of the N devices. Optionally, wireless communication may be performed between the location sensing apparatus and the N devices and between the N devices, and data is exchanged over the wireless communication link. A specific protocol for wireless communication is not limited herein.

It should be noted that this embodiment of this application is an apparatus side corresponding to the location sensing method described in the embodiment corresponding to FIG. 4 to FIG. 9. Some descriptions are not described herein again.

According to the location sensing apparatus provided in this embodiment of this application, relative locations of a plurality of devices can be obtained without a large amount of manual calibration and antenna array direction parameters of APs. In other words, a location layout of the plurality of devices that can be used for positioning is constructed. When the obtained location layout is used for positioning, a positioning result is a relative location of a to-be-positioned target in the location layout. Even if an geographical location of the to-be-positioned target is expected to be obtained, the APs are used as an example, the location sensing apparatus may also obtain geographical locations of a few APs, to obtain geographical locations of all the APs in the location layout based on relative locations of a plurality of APs, so as to provide a positioning service for an geographical location. This also greatly reduces workload of manual AP location calibration. The location sensing apparatus may be considered as a self-calibration apparatus of a positioning system, which can reduce workload of manually recording an AP location and an antenna array direction. An ADoA concept is proposed. The ADoA can be obtained if an AP location, an antenna array direction, and phase offset are unknown, and an overall AP location layout is obtained based on the ADoA.

An embodiment of this application provides a CSI-based positioning method. A to-be-positioned device in this embodiments of this application is a communications (for example, Wi-Fi communication) device that does not support a plurality of antennas or CSI detection but supports CSI data sending, for example, a currently commercial smartphone or a router. For a to-be-positioned device that supports a plurality of antennas and CSI obtaining, in a specific implementation, the step S300 may be performed, where the to-be-positioned device is considered as the device D participating in location layout construction.

For the to-be-positioned device, a main method repeats related processes in the steps S100, S200, and S300. Assuming that existing devices are A, B, and C, and the to-be-positioned device is D, ED={ABD, ACD, BAD, BCD, CAD, CBD}. Compared with the set E related to the device D in the step S300, because the to-be-positioned device cannot detect CSI, {ADB, ADC, BDA, BDC, CDA, CDB} is unavailable. However, based on an existing ED set, the step S300 may still be performed to determine a location of the to-be-positioned device D, that is, a relative location relative to the devices A, B, and C.

In a scenario in which an geographical location of the to-be-positioned device D needs to be determined on a map, a less labor-intensive manual calibration method may be used. To be specific, because a relative location relationship between all the devices is known, geographical locations of all the devices on the map may be obtained based on known locations of the three devices A, B, and C on the map, to locate the geographical location of the to-be-positioned device D. In other words, the geographical location of the to-be-positioned device is further obtained based on the steps S400 and S500. Compared with a conventional manual calibration method, this method is obviously advantageous in large-scale positioning. In the conventional method, geographical locations and antenna array directions of all supporting positioning devices (for example, the devices A, B, and C) need to be manually recorded. In the location sensing method described in this embodiment of this application, the geographical locations of only the three devices need to be learned, and antenna array directions of the devices do not need to be learned.

Figure 11:
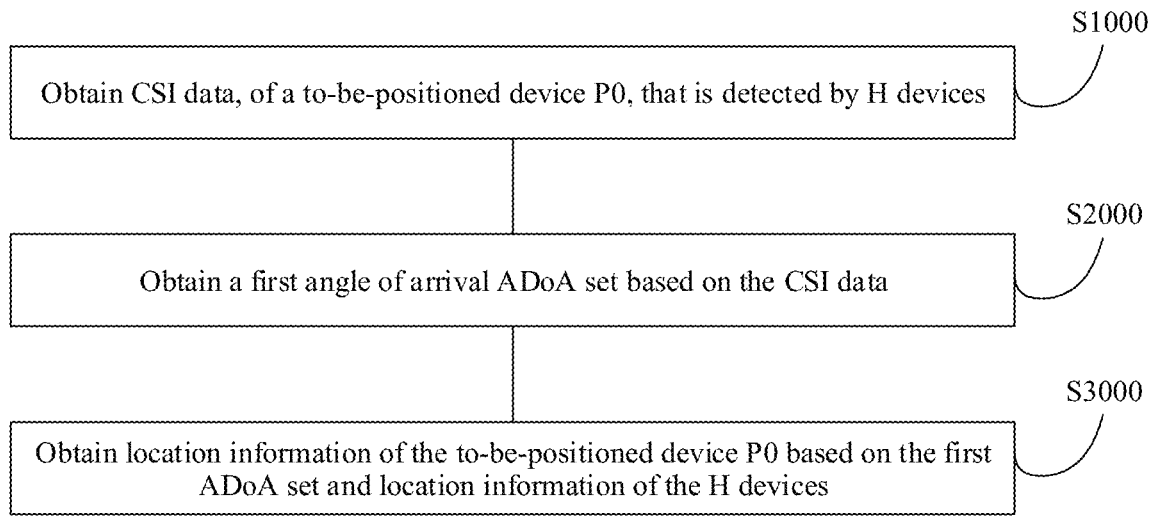
FIG. 11 is a flowchart of a CSI-based positioning method according to an embodiment of this application.

To better understand the CSI-based positioning method provided in this embodiment of this application, that a positioning server performs the positioning method is used as an example. As shown in FIG. 11, the positioning method includes the following steps.

S1000: The positioning server obtains CSI data, of a to-be-positioned device P0, that is detected by H devices, where M antennas arranged in a non-linear manner are configured for each of the H devices, H is an integer greater than or equal to 3, and M is an integer greater than or equal to 3. Optionally, the H devices have a same hardware requirement as the N devices in the CSI-based location sensing method described in the foregoing embodiment of this application. During specific implementation, when the to-be-determined device P0 needs a positioning service, the to-be-determined device P0 sends a signal to surroundings and sends a positioning request to the positioning service. The signal may be used to detect CSI data. After receiving the positioning request of the to-be-positioned device P0, the positioning server may send a message to a plurality of supporting positioning devices controlled by the positioning server, so that devices (the H devices) that detect the CSI data of the to-be-positioned device P0 send the detected CSI data of the to-be-positioned device P0 to the positioning server. Alternatively, the devices (the H devices) that detect the CSI data of the to-be-positioned device P0 may actively send the detected CSI data to the positioning server. Optionally, the positioning server may be a third-party device independent of the supporting positioning devices (including the H devices), or may be one of the supporting positioning devices. If the to-be-positioned device P0 has a sufficient processing capability, the to-be-positioned device P0 may be used as the positioning server to perform positioning for itself. In this embodiment of this application, to better describe functions of types of devices in a positioning process, only an example in which a third-party device is used as a positioning server is used. The positioning server, the supporting positioning devices, and the to-be-positioned device P0 may perform wireless communication. At least three antennas arranged in a non-linear manner and CSI data of a detectable signal may not be configured for the to-be-positioned device P0.

S2000: The positioning server obtains a first angle difference of arrival (ADoA) set based on the CSI data, where the first ADoA set includes an ADoA of the to-be-positioned device P0 and each of the H devices relative to each of the other devices in the H devices; and the ADoA is a difference between angles of arrival AoAs of two devices relative to a same device.

S3000: The positioning server obtains location information of the to-be-positioned device P0 based on the first ADoA set and location information of the H devices.

Further, the step S2000 includes:

S2100: The positioning server obtains a corresponding antenna phase difference set $R_{(P0 \to P1)}$ based on the CSI data of the to-be-positioned device P0 that is detected by a device P1, and obtains a corresponding antenna phase difference set $R_{(P2 \to P1)}$ based on CSI data of a device P2 that is detected by the device P1, where the device P1 and the device P2 are any one of the H devices, and the device P1 and the device P2 are not a same device; the antenna phase difference set $R_{(P0 \to P1)}$ is denoted as $\{\phi_{xy(P0 \to P1)} | x, y<M, x \neq y\}$, and $\phi_{xy(P0 \to P1)}$ indicates a phase difference between an $x^{th}$ antenna and a $y^{th}$ antenna of the device P1 in the antenna phase difference set $R_{(P0 \to P1)}$; and the antenna phase difference set $R_{(P2 \to P1)}$ is denoted as $\{\phi_{xy(P2 \to P1)} | x, y<M, x \neq y\}$, and $\phi_{xy(P2 \to P1)}$ indicates a phase difference between the $x^{th}$ antenna and the $y^{th}$ antenna of the device P1 in the antenna phase difference set $R_{(P2 \to P1)}$.

S2200: The positioning server obtains an ADoA of the to-be-positioned device P0 and the device P2 relative to the device P1 based on the antenna phase difference set $R_{(P0 \to P1)}$ and the antenna phase difference set $R_{(P2 \to P1)}$.

In a first case, the step S2200 further includes:

The positioning server selects a plurality of $\theta_{P0}$ within a range $[0, 2\pi]$, where $\theta_{P0}$ indicates an included angle between a direction on a plane on which the M antennas of the device P1 are located and a reference direction, and the reference direction is any direction on the plane on which the M antennas of the device P1 are located.

The positioning server obtains a plurality of $(\theta_{P0}, \theta_{P2})$ combinations based on the plurality of $\theta_{P0}$ and prestored $\theta_{P2}$, where $\theta_{P2}$ indicates an AoA of the device P2 relative to the device P1, and the AoA indicates an included angle between a projection of a signal direction on the plane on which the M antennas of the device P1 are located and the reference direction. The prestored $\theta_{P2}$ may be obtained and stored according to the CSI-based location sensing method described in the embodiment of this application corresponding to FIG. 4 to FIG. 9, or may be sent to the positioning server by the apparatus 1000.

The positioning server obtains a third energy spectrum based on the antenna phase difference set $R_{(P0 \to P1)}$, the antenna phase difference set $R_{(P2 \to P1)}$, and the plurality of $(\theta_{P0}, \theta_{P2})$ combinations, where each value in the third energy spectrum corresponds to one $(\theta_{P0}, \theta_{P2})$ combination and indicates a possibility that the corresponding $(\theta_{P0}, \theta_{P2})$ combination is a target $(\theta_{P0}, \theta_{P2})$ combination, and the target $(\theta_{P0}, \theta_{P2})$ combination indicates a combination of the AoA of the to-be-positioned device P0 relative to the device P1 and the AoA of the device P2 relative to the device P1.

The positioning server obtains a $(\theta_{P0}, \theta_{P2})$ combination corresponding to a maximum value in the third energy spectrum as the target $(\theta_{P0}, \theta_{P2})$ combination.

The positioning server calculates the ADoA of the to-be-positioned device P0 and the device P2 relative to the device P1 based on the target $(\theta_{P0}, \theta_{P2})$ combination.

In a second case, optionally, the step S2200 includes:

The positioning server selects a plurality of $(\theta_{P0}, \theta_{P2})$ combinations within a range $[0, 2\pi] \times [0, 2\pi]$, where $\theta_{P0}$ and $\theta_{P2}$ indicate included angles between a direction on a plane on which the M antennas of the device P1 are located and a reference direction, and the reference direction is any direction on the plane on which the M antennas of the device P1 are located.

The positioning server obtains a third energy spectrum based on the antenna phase difference set $R_{(P0 \to P1)}$, the antenna phase difference set $R_{(P2 \to P1)}$, and the plurality of $(\theta_{P0}, \theta_{P2})$ combinations, where each value in the third energy spectrum corresponds to one $(\theta_{P0}, \theta_{P2})$ combination and indicates a possibility that the corresponding $(\theta_{P0}, \theta_{P2})$ combination is a target $(\theta_{P0}, \theta_{P2})$ combination, and the target $(\theta_{P0}, \theta_{P2})$ combination indicates a combination of the AoA of the to-be-positioned device P0 relative to the device P1 and the AoA of the device P2 relative to the device P1.

The positioning server obtains a $(\theta_{P0}, \theta_{P2})$ combination corresponding to a peak value in the third energy spectrum as the target $(\theta_{P0}, \theta_{P2})$ combination.

The positioning server calculates the ADoA of the to-be-positioned device P0 and the device P2 relative to the device P1 based on the target $(\theta_{P0}, \theta_{P2})$ combination.

For the first case and the second case, the positioning server calculates, according to the following formula, a value that is in the third energy spectrum and that corresponds to any $(\theta_{P0}, \theta_{P2})$ combination:

$$\frac{1}{P(\theta_{P0}, \theta_{P2})} = \sum_{x \neq y} \left| \frac{e^{j\phi_{xy(P0 \to P1)}} \; e^{j2\pi d_{xy} \cos(\vartheta_{xy} - \theta_{P0})f/c}}{e^{j\phi_{xy(P2 \to P1)}} \; e^{j2\pi d_{xy} \cos(\vartheta_{xy} - \theta_{P2})f/c}} - 1 \right|$$

where $P(\theta_{P0}, \theta_{P2})$ indicates the value in the third energy spectrum, $d_{xy}$ indicates a distance between the $x^{th}$ antenna and the $y^{th}$ antenna of the device P1, $\vartheta_{xy}$ indicates an included angle between a connection direction of the $x^{th}$ antenna and the $y^{th}$ antenna of the device P1 and the reference direction, f is a frequency of a signal, c is a speed of light, e indicates an Euler number, and j indicates an imaginary number.

In the first case, because $\theta_{P2}$ is known, the determined target $(\theta_{P0}, \theta_{P2})$ combination may be directly obtained according to the foregoing steps.

However, in the second case, the determined target $(\theta_{P0}, \theta_{P2})$ combination may not be obtained by using the foregoing steps. If the third energy spectrum has two peak values, the positioning server obtains a $(\theta_{P0}, \theta_{P2})$ combination corresponding to either of the two peak values as the target $(\theta_{P0}, \theta_{P2})$.

If the third energy spectrum has at least two peak values, the positioning server further performs the following steps:

Step 1: Obtain a third down-sampling phase difference set of a $(\theta_{P0}, \theta_{P2})$ combination corresponding to each peak value, where one $(\theta_{P0}, \theta_{P2})$ combination corresponds to one third down-sampling phase difference set.

Step 2: Obtain, based on the third down-sampling phase difference set and by using a clustering method, the target $(\theta_{P0}, \theta_{P2})$ from $(\theta_{P0}, \theta_{P2})$ combinations corresponding to all peak values.

Further, in the step 1, if a third down-sampling phase difference set of a $(\theta_{P0}, \theta_{P2})$ combination corresponding to any peak value is denoted as $\{\phi_{xy}^{Down} | x, y<M, x \neq y\}$, the positioning server calculates $\phi_{xy}^{Down}$ according to the following formula:

$$\phi_{xy}^{Down} = \phi_{xy(P0 \to P1)} + 2\pi d_{xy} \cos(\vartheta_{xy} + \theta_{P0})f/c, \text{ or}$$

$$\phi_{xy}^{Down} = \phi_{xy(P2 \to P1)} + 2\pi d_{xy} \cos(\vartheta_{xy} + \theta_{P2})f/c, \text{ or}$$

$$\phi_{xy}^{Down} = \left( \left( \phi_{xy(P0 \to P1)} + \frac{2\pi d_{xy} \cos(\vartheta_{xy} + \theta_{P0})f}{c} \right) + \left( \phi_{xy(P2 \to P1)} + \frac{2\pi d_{xy} \cos(\vartheta_{xy} + \theta_{P2})f}{c} \right) \right) / 2$$

where $d_{xy}$ indicates the distance between the $x^{th}$ antenna and the $y^{th}$ antenna of the device P1, $\vartheta_{xy}$ indicates the included angle between the connection direction of the $x^{th}$ antenna and the $y^{th}$ antenna of the device P1 and the reference direction, f is the frequency of the signal, and c is the speed of light.

Further, in the step 2, the positioning server obtains a fourth down-sampling phase difference set of a $(\theta_{P0}, \theta_{P3})$ combination corresponding to each peak value in a fourth energy spectrum.

In a same coordinate system, the positioning server separately uses the third down-sampling phase difference set and the fourth down-sampling phase difference set as coordinates, obtains a ($\theta_{P0}$, $\theta_{P2}$)) combination corresponding to a third down-sampling phase difference set corresponding to a coordinate point closest to a coordinate point corresponding to the fourth down-sampling phase difference set, and uses the ($\theta_{P0}$, $\theta_{P2}$)) combination as the target ($\theta_{P0}$, $\theta_{P2}$) combination.

Before obtaining the fourth down-sampling phase difference set of the ($\theta_{P0}$, $\theta_{P3}$) combination corresponding to each peak value in the fourth energy spectrum, the positioning server further performs the following steps to obtain the fourth down-sampling phase difference set of the ($\theta_{P0}$, $\theta_{P3}$) combination corresponding to each peak value in the fourth energy spectrum:

The positioning server obtains a corresponding antenna phase difference set $R_{(P3 \to P1)}$ based on CSI data of a device P3 that is detected by the device P1, where the antenna phase difference set $R_{(P3 \to P1)}$ is denoted as $\{\phi_{xy(P3 \to P1)} | x, y < M, x \neq y\}$, $\phi_{xy(P3 \to P1)}$ indicates a phase difference between the $x^{th}$ antenna and the $y^{th}$ antenna of the device P1 in the antenna phase difference set $R_{(P3 \to P1)}$, and the device P3 is any one of the H devices and is not the same device as the device P1 and the device P2.

The positioning server selects a plurality of ($\theta_{P0}$, $\theta_{P3}$) combinations within the range $[0, 2\pi] \times [0, 2\pi]$, where $\theta_{P0}$ and $\theta_{P3}$ indicate the included angles between the direction on the plane on which the M antennas of the device P1 are located and the reference direction.

The positioning server obtains the fourth energy spectrum based on the antenna phase difference set $R_{(P0 \to P1)}$, the antenna phase difference set $R_{(P3 \to P1)}$, and the plurality of ($\theta_{P0}$, $\theta_{P3}$) combinations, where each value in the fourth energy spectrum corresponds to one ($\theta_{P0}$, $\theta_{P3}$) combination, and the fourth energy spectrum has at least two peak values.

Further, the positioning server calculates, according to the following formula, a value that is in the fourth energy spectrum and that corresponds to a ($\theta_{P0}$, $\theta_{P3}$) combination:

$$\frac{1}{P(\theta_{P0}, \theta_{P3})} = \sum_{x \neq y} \left| \frac{e^{j\phi_{xy}(P0 \to P1)} \; e^{j2\pi d_{xy} \cos(\theta_{xy} - \theta_{P0}) f/c}}{e^{j\phi_{xy}(P3 \to P1)} \; e^{j2\pi d_{xy} \cos(\theta_{xy} - \theta_{P3}) f/c}} - 1 \right|$$

where $P(\theta_{P0}, \theta_{P3})$ indicates the value in the fourth energy spectrum.

The CSI-based positioning method further includes:

The positioning server obtains the ADoA of the to-be-positioned device P0 and the device P3 relative to the device P1 based on a ($\theta_{P0}$, $\theta_{P3}$) combination corresponding to the fourth down-sampling phase difference set corresponding to the coordinate point closest to the coordinate point corresponding to the target ($\theta_{P0}$, $\theta_{P2}$) combination.

The CSI-based positioning method further includes:

The positioning server obtains an ADoA of the device P2 and the device P3 relative to the device P1 based on $\theta_{P2}$ in the target ($\theta_{P0}$, $\theta_{P2}$) combination and based on $\theta_{P3}$ in a ($\theta_{P0}$, $\theta_{P3}$) combination corresponding to the fourth down-sampling phase difference set corresponding to the coordinate point closest to the coordinate point corresponding to the target ($\theta_{P0}$, $\theta_{p}$) combination.

Further, the positioning server calculates, according to the following formula, the ADoA of the to-be-positioned device P0 and the device P2 relative to the device P1:

$$\Delta\theta_{(BAC)} = |\theta_{P0\,target} - \theta_{P1\,target}|$$

where $\Delta\theta_{(BAC)}$ indicates the ADoA of the to-be-positioned device P0 and the device P2 relative to the device P1, and $\theta_{P0\,target}$, $\theta_{P2\,target}$ are respectively $\theta_{pp}$, $\theta_{P2}$ in the target ($\theta_{P0}$, $\theta_{P2}$) combination.

In this embodiment of this application, any piece of CSI data may be denoted as $Ke^{j\varphi}$, where K indicates an amplitude of channel attenuation, $\varphi$ indicates a phase change of a signal on a channel, e indicates an Euler number, and j indicates an imaginary number.

Further, the positioning server calculates the phase difference $\theta_{xy}$ between the $x^{th}$ antenna and the $y^{th}$ antenna of the device P1 according to the following formula:

$$e^{j\phi_{xy}} = \frac{e^{j\varphi_y}}{e^{j\varphi_x}}$$

where $\varphi_x$ indicates the phase change $\varphi$, on the channel, of the signal in CSI data detected by the $x^{th}$ of the device P1, and $\varphi_y$ indicates the phase change (p, on the channel, of the signal in CSI data detected by the $y^{th}$ antenna of the device P1.

The step S3000 specifically includes the following steps:

The positioning server selects a plurality of predicted locations of the to-be-positioned device P0 based on the location information of the H devices, where the predicted location indicates possible location information of the to-be-positioned device P0.

The positioning server calculates a first error value based on the first ADoA set and a plurality of predicted ADoA sets corresponding to the plurality of predicted locations, where the plurality of predicted locations one-to-one correspond to the plurality of predicted ADoA sets, ADoAs in each predicted ADoA set one-to-one correspond to ADoAs in the first ADoA set, and one predicted ADoA set corresponds to one first error value.

The location server obtains a predicted location corresponding to a target predicted ADoA set as the location information of the to-be-positioned device P0, where the target predicted ADoA set is a predicted ADoA set that is in the plurality of predicted ADoA sets and that corresponds to a smallest first error value.

Further, the positioning server may calculate the first error value according to the following formula:

$$e = \sum_{\substack{\Delta\theta \in E \\ \Delta\theta' \in F}} (\Delta\theta - \Delta\theta')^2$$

where E indicates the first ADoA set, $\Delta\theta$ indicates the ADoA in E, F indicates any one of the plurality of predicted ADoA sets, $\Delta\theta'$ indicates an ADoA corresponding to $\Delta\theta$ in F, and e indicates a first error value corresponding to F.

Optionally, the positioning server may calculate the predicted location corresponding to the target predicted ADoA set according to the following formula:

$$L_Q = \arg \min_{L \in G} \sum_{\substack{\Delta\theta \in E \\ \Delta\theta' \in F_L}} (\Delta\theta - \Delta\theta')^2$$

where $L_Q$ indicates the predicted location corresponding to the target predicted ADoA set, K indicates the plurality of predicted locations, L indicates any predicted location in K, E indicates the first ADoA set, Δθ indicates the ADoA in E, $F_L$ indicates a predicted ADoA set corresponding to L, and Δθ' indicates an ADoA corresponding to Δθ in $F_L$.

It should be noted that the location information of the H devices may be relative locations of the H devices, or an geographical location of each of the H devices. The relative locations of the H devices or the geographical locations of the H devices are not limited to the CSI-based location sensing method described in the embodiment of this application corresponding to FIG. 4 to FIG. 9.

According to the CSI-based positioning method provided in this embodiment of this application, an ADoA geometrical relationship is introduced, so that a to-be-positioned target can be positioned when an antenna array direction of supporting positioning devices (for example, the foregoing H devices) is unknown. This can reduce workload of recording the supporting positioning device. In other words, an antenna direction does not need to be manually calibrated in a same manner as that in an existing positioning technology. In addition, if the to-be-positioned device P0 is a positioning server, the to-be-positioned device P0 can be directly positioned by using the CSI-based positioning method provided in this embodiment of this application, without obtaining the antenna array direction of the supporting positioning devices.

Optionally, antennas configured for each of the H devices are arranged in a triangle, in other words, in a triangular antenna layout. A test result shows that in any direction, 80% of an angle of arrival (AoA) can be measured in the triangular antenna layout, and a measurement error is within 9°. Compared with this layout, a measurement error of a linear antenna layout is 16°. The positioning method does not require large-scale onsite calibration, but can still reach precision that can be achieved by using a large-scale onsite calibration method. 80% of positioning errors are within 0.60 m.

Figure 12:
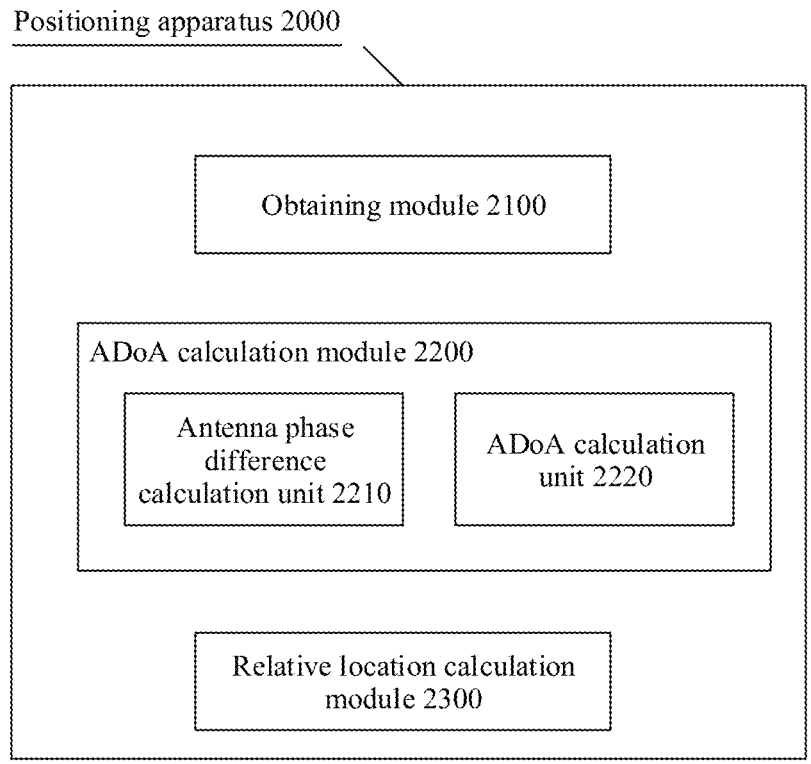
FIG. 12 is a block diagram of a positioning apparatus according to an embodiment of this application.

An embodiment of this application provides a positioning apparatus 2000. The positioning apparatus 2000 may be configured to perform the CSI-based positioning method described in the foregoing embodiment corresponding to FIG. 11. In other words, the positioning server that performs the CSI-based positioning method is a specific representation of the positioning apparatus 2000. The positioning apparatus 2000 may be a to-be-positioned device, or may be any other device that performs the CSI-based positioning method. Herein, only a function of performing the CSI-based positioning method is used as an example. Whether the positioning apparatus 2000 further has another function is not described herein. During specific implementation, the positioning apparatus 2000 and the location sensing apparatus 1000 mentioned in the foregoing embodiment may alternatively be a same apparatus. As shown in FIG. 12, the positioning apparatus 2000 includes an obtaining module 2100, an ADoA calculation module 2200, and a location information determining module 2300.

The obtaining module 2100 is configured to perform the step S1000 in the CSI-based positioning method (which may be referred to as the "positioning method" for short below) described in the embodiment of this application corresponding to FIG. 11. To be specific, the obtaining module 2100 is configured to obtain CSI data, of a to-be-positioned device P0, that is detected by H devices.

The ADoA calculation module 2200 is configured to perform the step S2000 in the positioning method, to be specific, obtain a first angle difference of arrival (ADoA) set based on the CSI data. More specifically, the ADoA calculation module 2200 includes an antenna phase difference calculation unit 2210 and an ADoA calculation unit 2220. The antenna phase difference calculation unit 2210 is configured to perform the step S2100, and the ADoA calculation unit 2220 is configured to perform the step S2200.

The location information determining module 2300 is configured to perform the step S3000 in the positioning method, to be specific, obtain location information of the to-be-positioned device P0 based on the first ADoA set and location information of the H devices that are obtained by the ADoA calculation module 2200.

It should be noted that the positioning apparatus described in this embodiment of this application performs the CSI-based positioning method described in the embodiment of this application corresponding to FIG. 11. For ease of reading, when the positioning apparatus is described, only modules or units in the positioning apparatus that perform the steps of the CSI-based positioning method are described. For specific descriptions, refer to a related part in the foregoing embodiment. Details are not described herein again.

According to the positioning method provided in this embodiment of this application, an ADoA geometrical relationship is introduced, so that a to-be-positioned target can be positioned when an antenna array direction of a supporting positioning device (for example, the foregoing H devices) is unknown. This can reduce workload of recording the supporting positioning device. In other words, an antenna direction does not need to be manually calibrated in a same manner as that in an existing positioning technology. In addition, if the to-be-positioned device P0 is the positioning apparatus, self-positioning can be directly implemented without a need to obtain an antenna array direction of the supporting positioning device.

Figure 13:
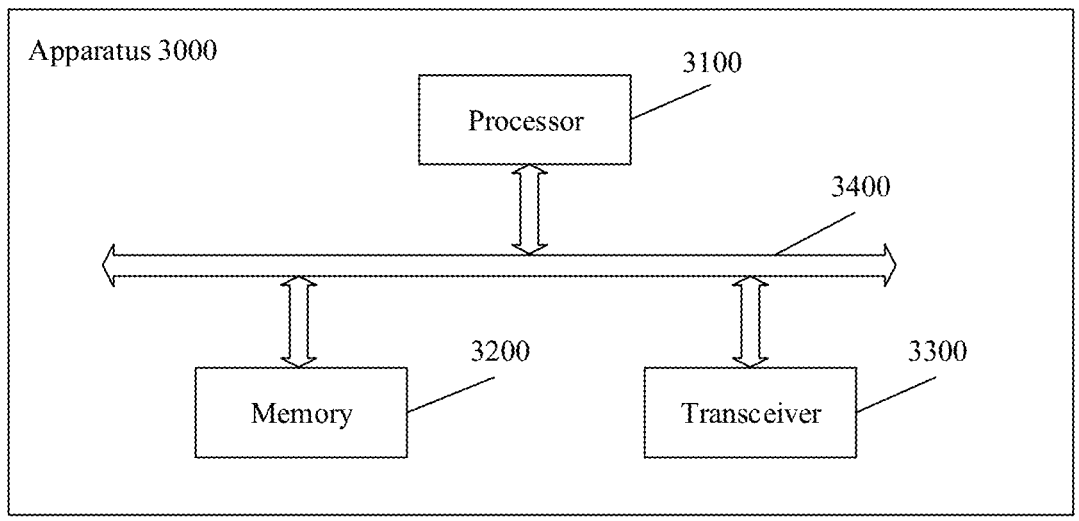
FIG. 13 is a block diagram of an apparatus according to an embodiment of this application.

FIG. 13 shows an apparatus 3000. The apparatus is configured with at least three antennas arranged in a non-linear manner and a CSI-supported communication function. The apparatus 3000 includes:

a processor 3100, a memory 3200, a transceiver 3300, and a communications bus 3400.

The communications bus 3400 is configured to implement connection and communication between these components.

The transceiver 3300 is configured to perform data transmission with an external system.

The memory 3200 may include a read-only memory and a random access memory, and provide an instruction and data to the processor 3100. A part of the memory 3200 may further include a non-volatile random access memory (NVRAM), for example, a RAM, a ROM, an EEPROM, a CD-ROM, an optical disc, a hard disk, or a magnetic storage apparatus. The memory 3200 may be configured to store one or more intermediate data such as a computer program instruction, a preset parameter, and data obtained through a computer intermediate operation.

The processor 3100 may be a central processing unit (central processing unit, CPU), a digital processing unit, or the like.

In this embodiment of the present invention, optionally, the processor 3100 includes an on-chip memory, for example, a TCM, a cache, or an SRAM. The on-chip memory stores an instruction.

The processor 3100 is coupled to the on-chip memory or the memory 3200, and is configured to perform the CSI-based location sensing method and/or the CSI-based positioning method described in the foregoing embodiments of this application. In practice, the processor 3100 may be an independently sold chip, or may be integrated into a chip.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive Solid State Disk (SSD)), or the like.

Figure 14:
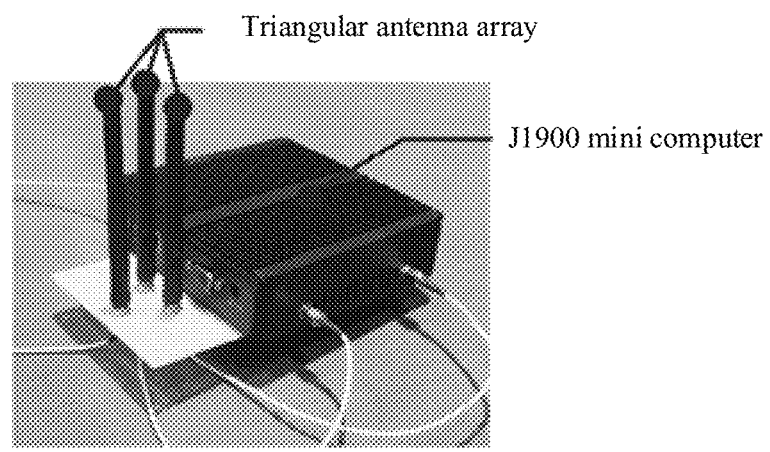
FIG. 14 is a schematic diagram of a triangular antenna array of a J1900 mini computer according to an embodiment of this application.

In a simple example, an Intel 5300 toolkit of a J1900 mini computer may be used to implement an AP (for example, any one of the devices mentioned in the CSI-based location sensing method and apparatus, or the H devices mentioned in the CSI-based positioning method and apparatus). The Intel 5300 toolkit can directly collect CSI received by the AP. The AP is equipped with three different antennas, and each antenna can retrieve CSI of 30 subcarriers. FIG. 14 is a diagram of an experimental device configured with three antennas (a triangular antenna array) arranged in an equilateral triangle.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A positioning method performed by a wireless device having at least three antennas located in a non-linear manner, the method comprising:
   receiving a positioning request for positioning a to-be-positioned device P0;
   obtaining channel state information (CSI) data from a signal sent by the to-be-positioned device P0 and received by the at least three antennas located in the non-linear manner;
   receiving CSI data from multiple supporting wireless devices, wherein the received CSI data are obtained by the supporting wireless devices from the signal sent by the to-be-positioned device P0, each of the supporting wireless devices has at least three antennas located in a non-linear manner, and the wireless device and the supporting wireless devices form H devices;
   obtaining a first angle difference of arrival (ADoA) set based on the CSI data obtained by the wireless device and the CSI data received from the supporting wireless devices, wherein the first ADoA set comprises ADoAs including an ADoA of the to-be-positioned device P0 and each of the H devices relative to each of other devices in the H devices, and the ADoA is a difference between angles of arrival (AoAs) of the device P0 and said each of the H devices relative to said each of other devices in the H devices; and
   obtaining location information of the to-be-positioned device P0 based on the first ADoA set and location information of the H devices;
   transmitting the location information of the to-be-positioned device P0 to the to-be-positioned device P0,
   wherein the step of obtaining the first angle difference of arrival (ADoA) set comprises:
   obtaining a corresponding antenna phase difference set $R_{(P0 \to P1)}$ based on the CSI data of the to-be-positioned device P0 that is detected by a device P1, and obtaining a corresponding antenna phase difference set $R_{(P2 \to P1)}$ based on CSI data of a device P2 that is detected by the device P1, wherein the device P1 and the device P2 are among the H devices, the antenna phase difference set $R_{(P0 \to P1)}$ is denoted as $\{\Phi_{xy(P0 \to P1)}|x,y<M, x \neq y\}$, and $\Phi_{xy(P0 \to P1)}$ indicates a phase difference between an $x^{th}$ antenna and a $y^{th}$ antenna of the device P1 in the antenna phase difference set $R_{(P0 \to P1)}$; and the antenna phase difference set $R_{(P2 \to P1)}$ is denoted as $\{\Phi_{xy(P2 \to P1)}/x,y<M, x \neq y\}$, and $\Phi_{xy(P2 \to P1)}$ indicates a phase difference between the $x^{th}$ antenna and the $y^{th}$ antenna of the device P1 in the antenna phase difference set $R_{(P2 \to P1)}$; and
   obtaining an ADoA of the to-be-positioned device P0 and the device P2 relative to the device P1 based on the antenna phase difference set $R_{(P0 \to P1)}$ and the antenna phase difference set $R_{(P2 \to P1)}$.

2. The positioning method according to claim 1, wherein the step of obtaining the ADoA of the to-be-positioned device P0 and the device P2 relative to the device P1 comprises:
   selecting a plurality of $\theta_{P0}$ within a range $[0,2\pi]$, wherein $\theta_{P0}$ indicates an included angle between a direction on a plane on which the M antennas of the device P1 are located and a reference direction, and the reference direction is any direction on the plane on which the M antennas of the device P1 are located;
   obtaining a plurality of $(\theta_{P0}, \theta_{P2})$ combinations based on the plurality of $\theta_{P0}$ and prestored $\theta_{P2}$, wherein $\theta_{P2}$ indicates an AoA of the device P2 relative to the device P1, and the AoA indicates an included angle between a projection of a signal direction on the plane on which the M antennas of the device P1 are located and the reference direction;
   calculating a third energy spectrum based on the antenna phase difference set $R_{(P0 \to P1)}$, the antenna phase difference set $R_{(P2 \to P1)}$, and the plurality of $(\theta_{P0}, \theta_{P2})$ combinations, the third energy spectrum comprises values each corresponding to one $(\theta_{P0}, \theta_{P2})$ combination and indicates a possibility that the corresponding $(\theta_{P0}, \theta_{P2})$ combination is a target $(\theta_{P0}, \theta_{P2})$ combination, and the target $(\theta_{P0}, \theta_{P2})$ combination indicates a combination of the AoA of the to-be-positioned device P0 and the device P2 relative to the device P1;

obtaining a ($\theta_{P0}$, $\theta_{P2}$) combination corresponding to a maximum value in the third energy spectrum as the target ($\theta_{P0}$, $\theta_{P2}$) combination; and calculating the ADoA of the to-be-positioned device P0 and the device P2 relative to the device P1 based on the target ($\theta_{P0}$, $\theta_{P2}$) combination.

3. The positioning method according to claim 1, wherein the step of obtaining the ADoA of the to-be-positioned device P0 and the device P2 relative to the device P1 comprises:

selecting a plurality of ($\theta_{P0}$, $\theta_{P2}$) combinations within a range $[0,2\pi] \times [0,2\pi]$, wherein $\theta_{P0}$ and $\theta_{P2}$ indicate included angles between a direction on a plane on which the M antennas of the device P1 are located and a reference direction, and the reference direction is any direction on the plane on which the M antennas of the device P1 are located;

calculating a third energy spectrum based on the antenna phase difference set $R_{(P0 \to P1)}$, the antenna phase difference set $R_{(P2 \to P1)}$, and the plurality of ($\theta_{P0}$, $\theta_{P2}$) combinations, the third energy spectrum comprises values each corresponding to one ($\theta_{P0}$, $\theta_{P2}$) combination and indicates a possibility that the corresponding ($\theta_{P0}$, $\theta_{P2}$) combination is a target ($\theta_{P0}$, $\theta_{P2}$) combination, and the target ($\theta_{P0}$, $\theta_{P2}$) combination indicates a combination of the AoA of the to-be-positioned device P0 and the device P2 relative to the device P1;

obtaining a ($\theta_{P0}$, $\theta_{P2}$) combination corresponding to a peak value in the third energy spectrum as the target ($\theta_{P0}$, $\theta_{P2}$) combination; and calculating the ADoA of the to-be-positioned device P0 and the device P2 relative to the device P1 based on the target ($\theta_{P0}$, $\theta_{P2}$) combination.

4. The positioning method according to claim 2, wherein the values of the third energy spectrum are calculated according to:

$$\frac{1}{P(\theta_{P0}, \theta_{P2})} = \sum_{x \neq y} \left| \frac{e^{j\phi_{xy}(P0 \to P1)} \; e^{j2\pi d_{xy} \cos(\vartheta_{xy} - \theta_{P0}) f/c}}{e^{j\phi_{xy}(P2 \to P1)} \; e^{j2\pi d_{xy} \cos(\vartheta_{xy} - \theta_{P2}) f/c}} - 1 \right|$$

wherein $P(\theta_{P0}, \theta_{P2})$ indicates the value in the third energy spectrum, $d_{xy}$ indicates a distance between the $x^{th}$ antenna and the $y^{th}$ antenna of the device P1, $\vartheta_{xy}$ indicates an included angle between a connection direction of the $x^{th}$ antenna and the $y^{th}$ antenna of the device P1 and the reference direction, f is a frequency of a signal, c is a speed of light, e indicates an Euler number, and j indicates an imaginary number.

5. The positioning method according to claim 2, wherein the step of calculating the ADoA calculates according to:

$\Delta\theta_{(BAC)} = |\theta_{P0\,target} - \theta_{P1\,target}|$ wherein $\Delta\theta_{(BAC)}$ indicates the ADoA of the to-be-positioned device P0 and the device P2 relative to the device P1, and $\theta_{P0}$ target, $\theta_{P2}$ target are respectively $\theta_{P0}$, $\theta_{P2}$ in the target ($\theta_{P0}$, $\theta_{P2}$) combination.

6. The positioning method according to claim 1, wherein the step of obtaining location information of the to-be-positioned device P0 based on the first ADoA set and location information of the H devices comprises:

selecting a plurality of predicted locations of the to-be-positioned device P0 based on the location information of the H devices, wherein the predicted location indicates possible location information of the to-be-positioned device P0;

calculating a first error value based on the first ADoA set and a plurality of predicted ADoA sets corresponding to the plurality of predicted locations, wherein the plurality of predicted locations one-to-one correspond to the plurality of predicted ADoA sets, ADoAs in each predicted ADoA set one-to-one correspond to ADoAs in the first ADoA set, and one predicted ADoA set corresponds to one first error value; and obtaining a predicted location corresponding to a target predicted ADoA set as the location information of the to-be-positioned device P0, wherein the target predicted ADoA set is a predicted ADoA set that is in the plurality of predicted ADoA sets and that corresponds to a smallest first error value.

7. A positioning wireless apparatus comprising:
at least three antennas located in a non-linear manner;
a memory storing executable instructions;
a processor configured to execute the executable instructions to perform operations of:

receiving a positioning request for positioning a to-be-positioned device P0;

obtaining channel state information (CSI) data from a signal sent by the to-be-positioned device P0 and received by the at least three antennas located in the non-linear manner;

receiving CSI data from multiple supporting wireless devices, wherein the received CSI data are obtained by the supporting wireless devices from the signal sent by the to-be-positioned device P0, each of the supporting wireless devices has at least three antennas located in a non-linear manner, and the positioning wireless apparatus and the supporting wireless devices form H devices;

obtaining a first angle difference of arrival (ADoA) set based on the CSI data obtained by the positioning wireless apparatus and the CSI data received from the supporting wireless devices, wherein the first ADoA set comprises a plurality of ADoAs including an ADoA for the to-be-positioned device P0 and each of the H devices relative to each of other devices in the H devices, and the ADoA is a difference between angles of arrival (AoAs) of the device P0 and said each of the H devices relative to said each of other devices in the H devices; and obtaining location information of the to-be-positioned device P0 based on the first ADoA set and location information of the H devices;

transmitting the location information of the to-be-positioned device P0 to the to-be-positioned device P0, wherein the operation of obtaining the first angle difference of arrival (ADoA) set comprises:

obtaining a corresponding antenna phase difference set $R_{(P0 \to P1)}$ based on the CSI data of the to-be-positioned device P0 that is detected by a device P1, and obtaining a corresponding antenna phase difference set $R_{(P2 \to P1)}$ based on CSI data of a device P2 that is detected by the device P1, wherein the device P1 and the device P2 are among the H devices, the antenna phase difference set $R_{(P0 \to P1)}$ is denoted as $\{\Phi_{xy(P0 \to P1)} | x,y < M,\ x \neq y\}$ and $\Phi_{xy(P0 \to P1)}$ indicates a phase difference between an $x^{th}$ antenna and a $y^{th}$ antenna of the device P1 in the antenna phase difference set $R_{(P0 \to P1)}$; and the antenna phase difference set $R_{(P2 \to P1)}$ is denoted as $\{\Phi_{xy(P2 \to P1)} | x,y < M,\ x \neq y\}$, and $\Phi_{xy(P2 \to P1)}$ indicates a phase difference between the $x^{th}$ antenna and the $y^{th}$ antenna of the device P1 in the antenna phase difference set $R_{(P2 \to P1)}$; and obtaining an ADoA of the to-be-positioned device P0 and the device P2 relative to the device P1 based on the antenna phase difference set $R_{(P0 \to P1)}$ and the antenna phase difference set $R_{(P2 \to P1)}$.

8. The positioning apparatus according to claim 7, wherein the operation of obtaining an ADoA of the to-be-positioned device P0 and the device P2 relative to the device P1 comprises:

selecting a plurality of $\theta_{P0}$ within a range [0,2π], wherein $\theta_{P0}$ indicates an included angle between a direction on a plane on which the M antennas of the device P1 are located and a reference direction, and the reference direction is any direction on the plane on which the M antennas of the device P1 are located;

obtaining a plurality of $(\theta_{P0}, \theta_{P2})$ combinations based on the plurality of $\theta_{P0}$ and prestored $\theta_{P2}$, wherein $\theta_{P2}$ indicates an AoA of the device P2 relative to the device P1, and the AoA indicates an included angle between a projection of a signal direction on the plane on which the M antennas of the device P1 are located and the reference direction;

calculating a third energy spectrum based on the antenna phase difference set $R_{(P0 \to P1)}$, the antenna phase difference set $R_{(P2 \to P1)}$, and the plurality of $(\theta_{P0}, \theta_{P2})$ combinations, the third energy spectrum comprises values each corresponding to one $(\theta_{P0}, \theta_{P2})$ combination and indicates a possibility that the corresponding $(\theta_{P0}, \theta_{P2})$ combination is a target $(\theta_{P0}, \theta_{P2})$ combination, and the target $(\theta_{P0}, \theta_{P2})$ combination indicates a combination of the AoA of the to-be-positioned device P0 and the device P2 relative to the device P1;

obtaining a $(\theta_{P0}, \theta_{P2})$ combination corresponding to a maximum value in the third energy spectrum as the target $(\theta_{P0}, \theta_{P2})$ combination; and calculating the ADoA of the to-be-positioned device P0 and the device P2 relative to the device P1 based on the target $(\theta_{P0}, \theta_{P2})$ combination.

9. The positioning apparatus according to claim 7, wherein the operation of obtaining an ADoA of the to-be-positioned device P0 and the device P2 relative to the device P1 comprises:

selecting a plurality of $(\theta_{P0}, \theta_{P2})$ combinations within a range [0,2π]×[0,2π], wherein $\theta_{P0}$ and $\theta_{P2}$ indicate included angles between a direction on a plane on which the M antennas of the device P1 are located and a reference direction, and the reference direction is any direction on the plane on which the M antennas of the device P1 are located;

calculating a third energy spectrum based on the antenna phase difference set $R_{(P0 \to P1)}$, the antenna phase difference set $R_{(P2 \to P1)}$, and the plurality of $(\theta_{P0}, \theta_{P2})$ combinations, the third energy spectrum comprises values each corresponding to one $(\theta_{P0}, \theta_{P2})$ combination and indicates a possibility that the corresponding $(\theta_{P0}, \theta_{P2})$ combination is a target $(\theta_{P0}, \theta_{P2})$ combination, and the target $(\theta_{P0}, \theta_{P2})$ combination indicates a combination of the AoA of the to-be-positioned device P0 and the device P2 relative to the device P1;

obtaining a $(\theta_{P0}, \theta_{P2})$ combination corresponding to a peak value in the third energy spectrum as the target $(\theta_{P0}, \theta_{P2})$ combination; and calculating the ADoA of the to-be-positioned device P0 and the device P2 relative to the device P1 based on the target $(\theta_{P0}, \theta_{P2})$ combination.

10. The positioning apparatus according to claim 8, wherein the values of the third energy spectrum are calculated according to:

$$\frac{1}{P(\theta_{P0}, \theta_{P2})} = \sum_{x \neq y} \left| \frac{e^{j\phi_{xy}(P0 \to P1)} \, e^{j2\pi d_{xy} \cos(\vartheta_{xy} - \theta_{P0})f/c}}{e^{j\phi_{xy}(P2 \to P1)} \, e^{j2\pi d_{xy} \cos(\vartheta_{xy} - \theta_{P2})f/c}} - 1 \right|$$

wherein $P(\theta_{P0}, \theta_{P2})$ indicates the value in the third energy spectrum, $d_{xy}$ indicates a distance between the $x^{th}$ antenna and the $y^{th}$ antenna of the device P1, $\vartheta_{xy}$ indicates an included angle between a connection direction of the $x^{th}$ antenna and the $y^{th}$ antenna of the device P1 and the reference direction, f is a frequency of a signal, c is a speed of light, e indicates an Euler number, and j indicates an imaginary number.

11. The positioning apparatus according to claim 8, wherein the step of calculating the ADoA calculates according to:

$$\Delta\theta_{(BAC)} = |\theta_{P0\,target} - \theta_{P1\,target}|$$

wherein $\Delta\theta_{(BAC)}$ indicates the ADoA of the to-be-positioned device P0 and the device P2 relative to the device P1, and $\theta_{P0}$ target, $\theta_{P2}$ target are respectively $\theta_{P0}$, $\theta_{P2}$ in the target $(\theta_{P0}, \theta_{P2})$ combination.

12. The positioning apparatus according to claim 7, wherein the operation of obtaining location information of the to-be-positioned device P0 based on the first ADoA set and location information of the H devices comprises:

selecting a plurality of predicted locations of the to-be-positioned device P0 based on the location information of the H devices, wherein the predicted location indicates possible location information of the to-be-positioned device P0;

calculating a first error value based on the first ADoA set and a plurality of predicted ADoA sets corresponding to the plurality of predicted locations, wherein the plurality of predicted locations one-to-one correspond to the plurality of predicted ADoA sets, ADoAs in each predicted ADoA set one-to-one correspond to ADoAs in the first ADoA set, and one predicted ADoA set corresponds to one first error value; and obtaining a predicted location corresponding to a target predicted ADoA set as the location information of the to-be-positioned device P0, wherein the target predicted ADoA set is a predicted ADoA set that is in the plurality of predicted ADoA sets and that corresponds to a smallest first error value.

* * * * *